US009849629B2

(12) United States Patent
Zaggl et al.

(10) Patent No.: US 9,849,629 B2
(45) Date of Patent: Dec. 26, 2017

(54) PROCESS FOR THE PRODUCTION OF A STRUCTURED FILM

(71) Applicant: W. L. Gore & Associates GmbH, Putzbrunn (DE)

(72) Inventors: Alexander Zaggl, Feldkirchen-Westerham (DE); Bernadette Heller, Newark, DE (US); Andre Hartmann, Munich (DE)

(73) Assignees: W. L. Gore & Associates GmbH, Putzbrunn (DE); W. L. Gore & Associates, Inc., Newark, DE (US)

( * ) Notice: Subject to any disclaimer, the term of this patent is extended or adjusted under 35 U.S.C. 154(b) by 73 days.

(21) Appl. No.: 14/907,668

(22) PCT Filed: Aug. 21, 2014

(86) PCT No.: PCT/EP2014/002294
§ 371 (c)(1),
(2) Date: Jan. 26, 2016

(87) PCT Pub. No.: WO2015/024662
PCT Pub. Date: Feb. 6, 2015

(65) Prior Publication Data
US 2016/0167291 A1    Jun. 16, 2016

(30) Foreign Application Priority Data

Aug. 23, 2013  (EP) .................................... 13004168

(51) Int. Cl.
*B01D 39/16*   (2006.01)
*B01D 46/54*   (2006.01)
(Continued)

(52) U.S. Cl.
CPC ........ *B29C 66/344* (2013.01); *B01D 39/1692* (2013.01); *B01D 46/543* (2013.01);
(Continued)

(58) Field of Classification Search
CPC .. B01D 39/1692; B01D 46/543; B01D 69/10; B01D 69/12; B01D 69/122; B29C 55/00;
(Continued)

(56) References Cited

U.S. PATENT DOCUMENTS 2,574,200 A * 11/1951 Teague .................. D03D 15/08
156/148
3,953,566 A    4/1976 Gore
(Continued)

FOREIGN PATENT DOCUMENTS

EP    2387959    11/2011
EP    2777542    9/2014
(Continued)

OTHER PUBLICATIONS

Escale, Pierre, et al., "Recent Advances in Honeycomb-Structured Porous Polymer Films Prepared Via Breath Figures", European Polymer Journal, Pergamon Press Ltd., Oxford, GB, vol. 48, No. 6, Mar. 1, 2012.

*Primary Examiner* — Jason M Greene
(74) *Attorney, Agent, or Firm* — Amy L. Miller

(57) ABSTRACT

The present invention relates to a process for the formation of a structured film, a structured film as such, an article comprising the structured film, a device for the continuous formation of such a structured film and a composite comprising the structured film.

28 Claims, 16 Drawing Sheets

(51) Int. Cl.
| | | |
|---|---|---|
| B29C 65/00 | (2006.01) | |
| B29C 55/00 | (2006.01) | |
| B32B 37/14 | (2006.01) | |
| B32B 37/16 | (2006.01) | |
| B32B 3/26 | (2006.01) | |
| B32B 27/08 | (2006.01) | |
| B32B 27/28 | (2006.01) | |
| B32B 27/32 | (2006.01) | |
| B29C 55/02 | (2006.01) | |
| B32B 38/00 | (2006.01) | |
| B29D 7/01 | (2006.01) | |
| C08J 5/18 | (2006.01) | |
| B32B 25/08 | (2006.01) | |
| B32B 27/30 | (2006.01) | |
| B32B 27/40 | (2006.01) | |

(52) U.S. Cl.
CPC ............ *B29C 55/00* (2013.01); *B29C 55/005* (2013.01); *B29C 55/02* (2013.01); *B29C 66/45* (2013.01); *B29C 66/727* (2013.01); *B29D 7/01* (2013.01); *B32B 3/26* (2013.01); *B32B 25/08* (2013.01); *B32B 27/08* (2013.01); *B32B 27/283* (2013.01); *B32B 27/306* (2013.01); *B32B 27/322* (2013.01); *B32B 27/40* (2013.01); *B32B 37/144* (2013.01); *B32B 37/16* (2013.01); *B32B 38/0012* (2013.01); *C08J 5/18* (2013.01); *B32B 2305/026* (2013.01); *B32B 2307/51* (2013.01); *B32B 2307/518* (2013.01); *B32B 2307/724* (2013.01); *B32B 2327/12* (2013.01); *B32B 2327/18* (2013.01); *B32B 2383/00* (2013.01)

(58) Field of Classification Search
CPC ..... B29C 55/005; B29C 55/02; B29C 66/344; B29C 66/45; B29C 66/727; B32B 3/26; B32B 25/08; B32B 27/08; B32B 27/083; B32B 27/306; B32B 27/322; B32B 27/40; B32B 37/144; B32B 37/16; B32B 38/0012; B32B 2305/026; B32B 2307/51; B32B 2307/724; B29D 7/01; C08J 5/18
See application file for complete search history.

(56) References Cited

U.S. PATENT DOCUMENTS

| | | |
|---|---|---|
| 4,932,078 A | 6/1990 | Jones et al. |
| 5,814,405 A | 9/1998 | Branca et al. |
| 5,874,165 A | 2/1999 | Drumheller |
| 6,630,426 B1 * | 10/2003 | Ference .............. H01L 39/2464 505/320 |
| 7,306,729 B2 | 12/2007 | Bacino et al. |
| 2004/0091677 A1 | 5/2004 | Topolkaraev |
| 2006/0076103 A1 * | 4/2006 | Clarke .................. B29C 66/344 156/229 |
| 2007/0012624 A1 | 1/2007 | Bacino et al. |
| 2008/0317660 A1 * | 12/2008 | Pan ........................ B82Y 10/00 423/447.2 |
| 2009/0227165 A1 | 9/2009 | Imai |
| 2010/0121350 A1 | 5/2010 | Mirigian |
| 2012/0058302 A1 * | 3/2012 | Eggenspieler ......... B01D 69/12 428/141 |
| 2015/0273737 A1 * | 10/2015 | Chen ...................... B29C 41/22 428/336 |
| 2017/0095966 A1 * | 4/2017 | Saha .................... B29C 55/005 |

FOREIGN PATENT DOCUMENTS

| | | |
|---|---|---|
| JP | 2008-516806 | 5/2008 |
| JP | 2000-512904 A | 3/2010 |
| WO | WO2007/106495 | 9/2007 |

* cited by examiner

PROCESS FOR THE PRODUCTION OF A STRUCTURED FILM

The present invention relates to a process for the formation of a structured porous film, a structured porous film as such, an article comprising the structured porous film, a device for performing said process and a composite comprising the structured porous film.

Structuring the shape of a material, especially structuring the surface shape of a material with an extension which is small in one direction compared to the other directions (film), is a useful tool in order to improve and/or fine-tune its properties. A common method to achieve such a structuring is photolithography followed by casting of a polymer on the etched surface. In other structuring methods, use has been made of elastic substrates.

For example, US 2012/0058302 discloses a method of forming a micro- or nano-topography on the surface of a layered composite material in order to improve its anti-fouling properties.

In this method, a substrate is stretched and subsequently coated. The coating is applied by initiated chemical vapour deposition (iCVD), or a spraying or evaporation technique, so that that coating is formed on the stretched surface of the substrate and firmly adheres thereto. Upon releasing the strain in the stretched substrate, the coated surface buckles and hence surface structures on a microscopic scale are formed.

However, due to the firm adherence of the coating to the surface, the buckling of the coating forces the surface of the substrate to follow the microstructures of the coating and hence both the coating and the adhering substrate form the micro-structured surface of the composite. It is not possible to separate the coating from the composite without destroying the micro-structured surface or even the complete coating and/or substrate.

Furthermore, in the area of "flexible electronics", periodic structures for electronic circuitry have been produced by wrinkling and delamination of thin stiff films. For example, Vella et al. investigated the formation and dimension of "blisters" of thin stiff films adhered to polymer substrates ("*The macroscopic delamination of thin films from elastic substrates*", Proceedings of the National Academy of Sciences, Vol. 106, No. 27, 10901-10906). In this investigation, a substrate onto which a bi-oriented PP film has been laminated is subsequently uniaxially compressed and the film is wrinkled with a well-defined wavelength.

However, all these known methods are entirely silent on the structuring of porous materials so that there is still a need for a process for the structuring, in particular the micro- and nano-structuring, of porous film materials. Furthermore, such a process should also allow to obtain the structured film as such, i.e. separate from a substrate.

It is thus an object of the invention to provide a process for the formation of a structured porous film which shows any kind of geometric out-of-plane structures, such as wrinkles, foldings etc., which process should allow to tailor the structures especially on micro- and nanoscopic level, to obtain a permanent structuring of the film, and to obtain the structured film as such, separate from a substrate.

In addition, the process should be simple and cost-efficient to perform.

Surprisingly, it has been found that these objects can be achieved by a process comprising the application of a porous film onto a stretched elastic substrate, and relaxing the stretched substrate so as to form a structured film.

The present invention therefore provides a process for the formation of a structured porous film comprising
a) application of a porous film onto an elastic substrate in a stretched state such that a reversible adhesion of the film on the stretched substrate occurs, and
b) relaxing the substrate with the applied film thereon to obtain the structured porous film.

The process of the invention allows in a simple manner to structure a porous film on the macroscopic, and even microscopic or nanoscopic level. The process is simple because the porous film can be applied onto the stretched elastic substrate "as it is", i.e. without the need of any physical or chemical modification. Surprisingly, upon relaxation of the stretched substrate/film composite, the composite, or even the film, is not simply destroyed, e.g. by a complete delamination of film and substrate or a rupture of the film, but the film remains intact and at least partially adhered to the substrate in a recurring manner, so that structuring occurs in a controlled manner.

As a consequence of the partial non-adherence of the film, the substrate in the final relaxed state is not structured, but it returns to its flat, non-stretched state. This enables the easy removal of the structured porous film from the substrate without that the film or its structure is destroyed, i.e. the structured porous film can easily be obtained as such, separate from a substrate.

Without wishing to be bound by theory it is believed that this behaviour of the porous films is at least in part due to an inherent high flexibility of the films as expressed e.g. by a low rigidity.

Due to its simplicity, the process of the invention can be performed in a cost-efficient manner, both continuously or batch-wise.

The structured porous film formed in the process of the invention can, for instance, be used for filtration or venting applications. The use of such a structured porous film has, inter alia, the advantage that the surface area of the filter or vent, and hence its performance, is significantly increased while the required space of the filter or vent may remain the same.

In the process of the invention the porous film should be applied to the elastic substrate so that "reversible adhesion" of the film to the substrate occurs. This means that when the substrate is in its stretched state the film adheres to the substrate, and in the relaxed state of the substrate the then structured film obtained may be removed from the substrate without destroying the structured film.

The term "film" as used herein generally denotes any kind of "thin" material, i.e. material which has an extension in two dimensions that is big compared to the extension in the remaining dimension, e.g. by a factor of at least 10, or at least 100 or even more. Such thin material is sometimes also denoted as "2D structure".

By "structured film", a film is denoted which shows any kind of geometric out-of-plane structures, such as wrinkles, foldings etc. This means that the structured film not only shows a patterned surface, e.g. by a variation of the total thickness of an otherwise planar film, but the "complete" film is folded or wrinkled to show the out-of-plane structures. The film thickness usually remains essentially the same as in the unstructured film.

The term "porous" as used herein refers to a material which has voids throughout the internal structure which form an interconnected continuous air path from one surface to the other.

The term "porous film" as used herein denotes a film which comprises, or consists of, a porous material. For example, a porous material may be expanded polytetrafluoroethylene (PTFE) and/or any other paste processed expanded fluoropolymers and combinations thereof.

A porous film comprising a porous material may further comprise coatings or layers laminated on a layer of said porous material, such as, but not limited to, polymeric rendered fibrils, powder coatings, non-woven coatings, partial coatings such as lines, dots, patterns.

The porous film may have a multilayered structure, wherein at least one layer comprises, or consists of, a porous material. The porous film hence may comprise, or consist of, one, two, three or more layers.

For example, the porous film may comprise, or consist of, a layer of ePTFE coated with a monolithic film, which may further comprise a second layer of ePTFE on its opposite side.

The porous film may comprise, or consist of, a woven or non-woven. For example, the porous film may comprise, or consist of, an electrospun non-woven material.

"Porous" refers to porous materials in which the pores are empty, but also refers to partially or fully imbibed porous materials, i.e. materials which have a porous structure in which the pores are partially or fully filled with a substance, as long as the porous material remains a porous matrix that may dominate the materials properties. For example, such an imbibed porous material may be a porous material in which the pores partly or fully are filled with a flexible material, such as a liquid, or an uncured, flexible substance.

The rigidity of such imbibed porous films can be tuned e.g. by temperature. If the filling material is flexible such as an uncured, liquid like or melted material, the matrix of the porous film holds the material in place and still dominates the film properties.

The film may be homogeneous or non-homogeneous in terms of its chemical composition. The film may contain voids, i.e. sections of the film do not show any matter in a lateral cut, or, preferably, may not contain voids, i.e. be closed.

The structured porous film obtained from the process of the invention is removable from the elastic substrate in a non-destructive manner.

In one embodiment, the process of the invention is carried out at room temperature, i.e. at a temperature of from 18 to 27° C., in particular 20 to 25° C. However, if a porous film is found to have a too high rigidity for the process of the invention, in particular step b), may also be carried out e.g. at an elevated temperature where the rigidity of the film is lower compared to its room temperature rigidity.

In the process of the invention, the substrate may be uniaxially or biaxially stretched.

Due to the flexibility of the porous film, in the process of the invention the obtained structure of the film must usually be fixed by suitable means in order to obtain a permanently structured film.

Thus, in one embodiment of the process of the invention, a backer material is applied to the structured film.

The backer material usually is also in the form of a film. It is usually made to permanently adhere, i.e. be bonded, to the structured film, so that it stabilises/fixes the structures of the film, thus making them rest permanently.

In order to bond the backer material to the structured film, for example, the backer material may be provided with an adhesive layer prior to applying it to the structured film.

The backer material usually is non-stretchable. However, also a stretchable material may be used. In one embodiment, the backer may be formed by the stretchable substrate which was used to structure the film.

For example, a non-woven material such as copolyester bicomponent material may be used as backer material. Additionally, an adhesive such as a hot-melt web adhesive may be used to bond the backer material to the structured film, which is first applied to the backer material.

The backer material may be applied to the "free" side (opposite to the substrate) of the structured porous film when it is still adhered to the relaxed, elastic substrate. In another embodiment, the backer is applied to any side of the structured film after the film has been removed from the elastic substrate.

The porous film which is applied onto the elastic substrate preferably comprises, or consists of, a polymer, and more preferably comprises, or consists of, a fluoropolymer, i.e. a polymer which contains fluorine atoms, a polyvinylalcohol, a polyurethane and/or a polyolefin.

Especially polyvinylalcohol and polyurethane may also be in the form of a porous film of woven or non-woven fibres comprising, or consisting of, these materials.

In one embodiment, the porous film comprises, or consists of, polytetrafluoroethylene (PTFE), a modified PTFE, a fluorothermoplastic, a fluoroelastomer or any combination thereof.

The term "modified PTFE" as used herein is intended to denote a type of tetrafluoroethylene copolymer in which further perfluorinated, fluorinated or non-fluorinated co-monomer units are present.

In one embodiment, the porous film comprises, or consists, of expanded PTFE (ePTFE). PTFE may be expanded (i.e., drawn) in one or more directions to make the fluoropolymer film porous. Processes for making ePTFE are well known in the art, e.g. from U.S. Pat. No. 3,953,566 or U.S. Pat. No. 5,814,405.

Preferably, the porous film has a thickness of at least 0.5 µm, more preferably of at least 1 µm, even more preferably of at least 1.5 µm, and most preferably of at least 2 µm.

The porous film has preferably a thickness of at most 250 µm, more preferably at most 200 µm, even more preferably at most 175 µm, and most preferably at most 50 µm.

The porous film may have an areal weight of 0.01 g/m$^2$ or more, more preferably of 0.1 g/m$^2$ or more, and still more preferably of 0.2 g/m$^2$ or more.

The porous film may have an areal weight of 100 g/m$^2$ or less, more preferably of 80 g/m$^2$ or less, still more preferably of 50 g/m$^2$ or less, and still more preferably of 30 g/m$^2$ or less.

The elastic substrate used in the process of the invention may be any elastic material which shows the required stretchability and which shows a sufficient adhesion to the applied porous film.

Preferably, the substrate comprises, or consists of, an elastomer, such as silicone rubbers, fluoro- and perfluoroelastomers nitrile rubbers, isoprene rubbers, ethylene/propylene rubbers, polyacrylic rubbers, polychloroprene rubbers, polyvinylchloride rubbers, silicone rubbers, natural rubbers and/or thermoplastic rubbers, such as thermoplastic polyurethane rubbers.

A preferable substrate comprises, or consists of, polydimethylsiloxane (PDMS).

Before application of the porous film onto the elastic substrate, the substrate is stretched in at least one direction. Stretching can be performed uniaxially (e.g. in a continuous process in machine direction) or biaxially, i.e. in two perpendicular directions (e.g. in a continuous process in machine and transverse direction).

The extent of stretching is defined by the processing ratio p which as used herein is defined as $p(\%)=100(l-L)/L+100$ wherein l is the final length or width of the elastic substrate in its stretched state, and wherein L is the initial length or width of the elastic substrate, i.e. in its non-stretched, relaxed state.

For instance, a processing factor of 200% means that the final length l in the stretched state is two times the initial, relaxed-state length L of the substrate, i.e. l=2·L.

Preferably, the elastic substrate in step a) is stretched by a processing ratio of at least 110% in at least one direction, more preferably by a ratio of at least 150% in at least one direction, and most preferably by a ratio of at least 200% in at least one direction.

The elastic substrate is preferably stretched by a processing ratio of at most 1100%, more preferably by a ratio of at most 850%, and most preferably by a ratio of at most 600%.

In one embodiment, the elastic substrate is uniaxially stretched. Uniaxially means that the elastic substrate is stretched only in one direction, which may, if the process is performed continuously, either be the machine direction (MD) or the transverse direction (TD).

In another embodiment, the elastic substrate is biaxially stretched. Biaxially means that the elastic substrate is stretched in two perpendicular directions which may be, if the process is performed continuously, the machine direction (MD) and the transverse direction (TD).

Biaxial stretching can be performed simultaneously or subsequently. Simultaneously means that the elastic substrate is stretched at the same time in the two perpendicular directions, e.g. machine direction and transverse direction. Subsequently means that the elastic substrate is (fully) stretched first in one, and subsequently in the other, perpendicular direction.

The porous film is applied onto the elastic substrate in a stretched state such that reversible adhesion of the film on the stretched elastic substrate occurs.

Usually, the porous film is directly applied onto the stretched substrate, i.e. without any intermediate layer. However, such an intermediate layer may be used where necessary to obtain proper adhesion.

Application of the porous film onto the substrate is preferably done by mechanically pressing a porous film onto the stretched elastic substrate. Pressing can, for instance, be done with a rubber roll at slight pressure.

"Adhesion" as used herein means that the porous film physically adheres to the elastic substrate. Without wishing to be bound by theory, it is believed that the film physically adheres to the elastic substrate due to van-der-Waals forces.

"Reversible adhesion" means that no firm "bonding" should appear between the substrate and the film, as is the case if a coating is applied on a substrate e.g. by chemical vapour deposition to the substrate in the stretched state so that the film cannot be removed from the substrate in a non-destructive manner.

Application and adhesion of the film onto the elastic substrate occurs at a specific process temperature. The process temperature may be room temperature, or, in order to, for example to adjust the film rigidity, at an elevated temperature, especially in step b) of the process.

After application of the film to the stretched elastic substrate, the elastic substrate is relaxed in step b) of the process of the invention. Relaxing as used herein means that the strain is released from the substrate and the substrate returns to its initial, non-stretched and flat state.

Relaxing of the stretched elastic substrate causes the adhered self-supported porous film to wrinkle, thereby forming the structured film. Without wishing to be bound by theory, it is believed that relaxing of the stretched substrate causes a partial or local loss of adhesion between the applied film and the elastic substrate. At those sites where a partial loss of adhesion occurs, wrinkles in the applied film can be formed.

In one embodiment, the substrate may show a patterned surface topography, i.e. a surface which comprises elevated sections, e.g. in the form of a grid structure or in the form of bumps and/or ridges. With such substrates the control of the structuring of the porous film can still be improved and e.g. a finer structure can be imposed to the film.

In one embodiment, the process further comprises a step c) of removing the structured porous film from the elastic substrate, which may already have been provided with a backer material. Removing can be done by mechanically lifting off the structured film from the relaxed elastic substrate.

The present invention also provides a structured film obtainable by the process in any of its embodiments as described above.

In one embodiment, the structures of said film have a height of at least two times the thickness of the non-structured film and the structure density in at least one direction is at least 1 per mm.

The present invention further provides a porous film comprising a structured section wherein the structures in said section have a height of at least two times the thickness of the non-structured film and the structure density in at least one direction is at least 1 per mm.

Preferably, the structured porous film of the invention is formed by the process of the invention in any of the above-described embodiments.

Furthermore, all embodiments as described above for the process of the invention are also preferred embodiments of the structured porous film of the invention, where applicable. For example, the structured porous film may also comprise, or consist of, a polymer, such as ePTFE.

In other embodiments of the structured porous film of the invention, the structure density in at least one direction is at least 2 per mm, or is at least 3 per mm, or is at least 5 per mm.

The height of the structures in the porous film preferably is 2 µm to 2000 µm, and more preferably 20 µm to 1000 µm.

The structured porous film in one embodiment should have a theoretical or measured area increase factor of at least 1.8, in a further embodiment an area increase factor of at least 3.0, and in still a further embodiment an area increase factor of at least 5.0.

The "area increase factor" denotes the increase in total surface area of the structured film compared to the non-structured film, which is caused by the structuring, i.e. the presence of out-of-plane structures in the film.

It can be determined either theoretically by considering the processing ratio(s) or it can be measured by e.g. removing the backer material of a structured film and stretching the film so that the structures are removed from the film.

For example, a structured film which was obtained by a process in which uniaxial stretching of the substrate with a processing ratio of 2 has been applied will show a (theoretical) area increase factor of 2. A structured film which was obtained by a process in which biaxial stretching of the substrate with a processing ratio of 2 in each direction has been applied will show a (theoretical) area increase factor of 4.

The present invention also relates to articles comprising the structured porous film as obtainable by the process of the invention in any of its above described embodiments or comprising the structured porous film of the invention in any of its above described embodiments.

Preferably, the article is a vent or a filter.

Especially in the application in a vent or filter the structured film shows significant advantages over a non-structured film. For example, due to the structuring of the porous film the effective surface area of the film for venting or filtering is strongly increased, while the required space of the vent or filter is not altered compared to a vent or filter comprising a non-structured film.

The present invention also relates to a device for performing the process of the invention in any of the above described embodiments in a continuous manner which comprises
  a) a moveable elastic substrate belt arranged such that at least a portion of the elastic substrate belt is transformed from a stretched to a relaxed state during movement of the belt, and
  b) a means to apply a film onto said elastic substrate belt in the stretched state such that adhesion of the film on the stretched substrate occurs
wherein the structured film is obtained through the transformation of the elastic belt from the stretched to the relaxed state with the film applied thereto.

In one embodiment of the device, the elastic substrate belt is a closed belt or tube, running on at least two rotatable rolls.

In such an embodiment, stretching in the machine direction can be effected by driving a first roll, on which the belt is running, with a higher surface velocity than a second roll on which the belt is running, too.

In a further embodiment of the device, stretching in the direction perpendicular to the moving direction of the belt, i.e. the transverse direction, is effected by means of pairs of clamps which are arranged opposed to each other so as to hold the belt at each of its sides and are moving with the belt, wherein the distance of the clamps in a pair is altered so that the width of the belt changes from a stretched to a relaxed state.

The clamps may be arranged so that they run in a rail along with the belt.

In a further embodiment of the device, at least one pressure roll is provided at a position where the belt is stretched which presses the film onto the stretched substrate belt, so as to effect adhesion of the film to the substrate.

Furthermore, the device may comprise means, e.g. a roll, on which the structured film is spooled after de-adhesion, i.e. removal, from the substrate belt.

Still further, the device may comprise means, e.g. a roll, from which a backer material is supplied to the structured film.

The device may further comprise a heater through which the backer material is pre-heated before it comes into contact with the structured film. This may serve to melt an adhesive provided on the backer material.

Still further, the invention also relates to a composite comprising a structured film supported on a backer material which has an asymmetric airflow of at least 30%.

"Asymmetric airflow" as used herein denotes a relative difference in airflow passing through the membrane from opposite directions, namely the difference in airflow for direction "down" and direction "up".

Airflow directions "up" and "down" are defined as follows: "Up" as used herein denotes an airflow flowing perpendicular to the composite which enters the composite at the side of the backer and leaves the composite at the side of the structured film. The term "down" as used herein corresponds to the airflow flowing in opposite direction to "up".

For example, a composite showing an airflow of 100 l/h in direction "down" and 130 l/h in direction "up" has an asymmetric airflow of 30%.

It is believed that the difference in airflow in directions "down" and "up" is due to the fact that the structures in the structured film are pressed together when the air flow is in the "down" direction, and unfold when the airflow is in the "up" direction.

Preferably, the structured film in the composite comprising a structured film supported on a backer material which has an asymmetric airflow of at least 30% is produced in a process and/or is a structured film in any of the embodiments as described herein.

The present invention will be further illustrated by the examples described below, and by reference to the following figures:

FIG. 1*a*) to *d*) show a schematic drawing of an exemplary device for performing the process of the invention involving biaxial stretching in a non-continuous manner.

Figure 10:
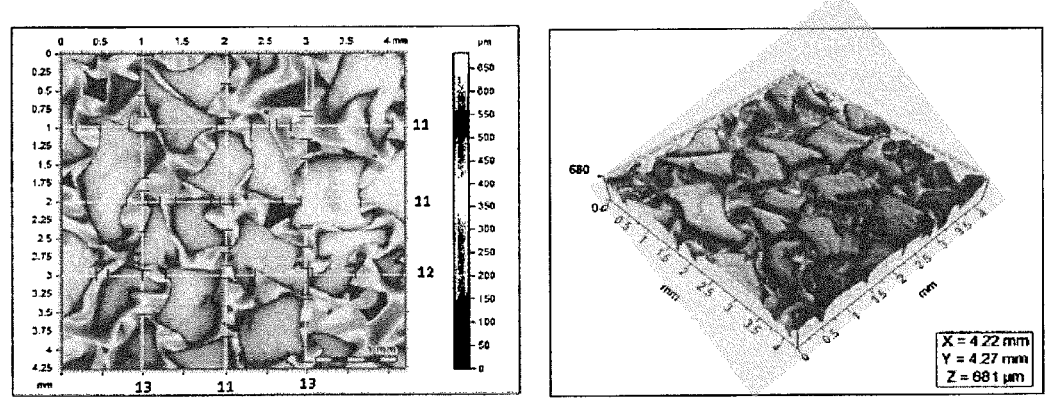

In FIG. 10, the determination of the structure density of the structured film of Example 1C is shown (left hand image). In the right hand image, a surface topography is shown.

Figure 11:
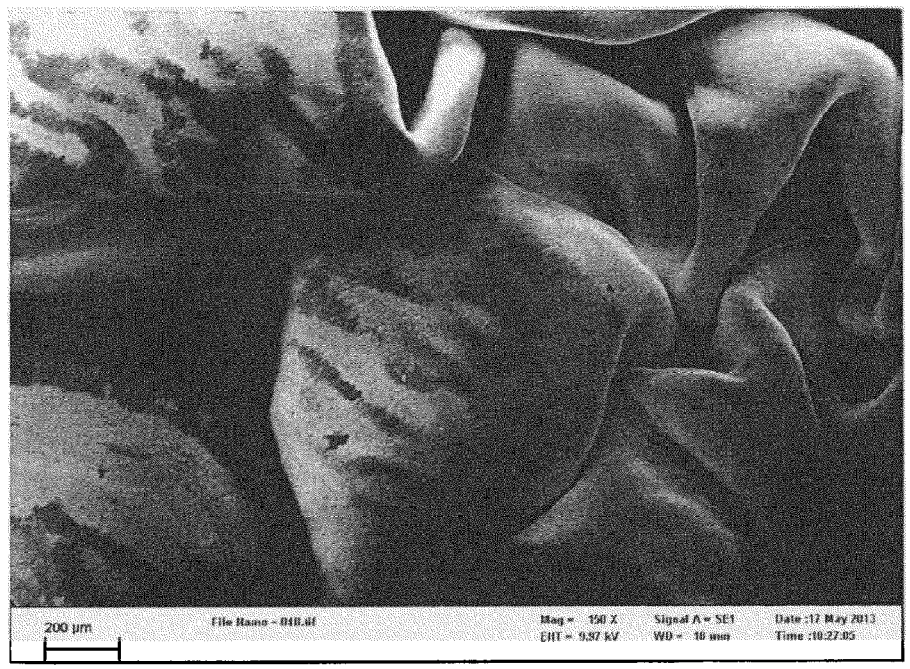

FIG. 11 is a SEM image (top view) of the structures film of Example 1D.

Figure 12:
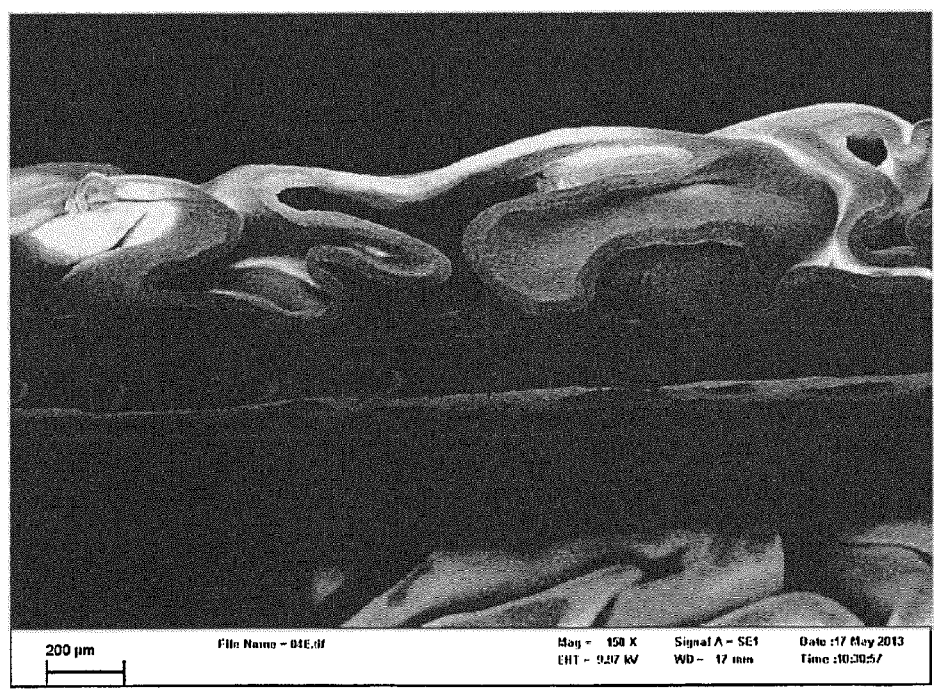

FIG. 12 is a SEM image showing a side view of the structured film of Example 1D which is supported on a backer material.

Figure 13:
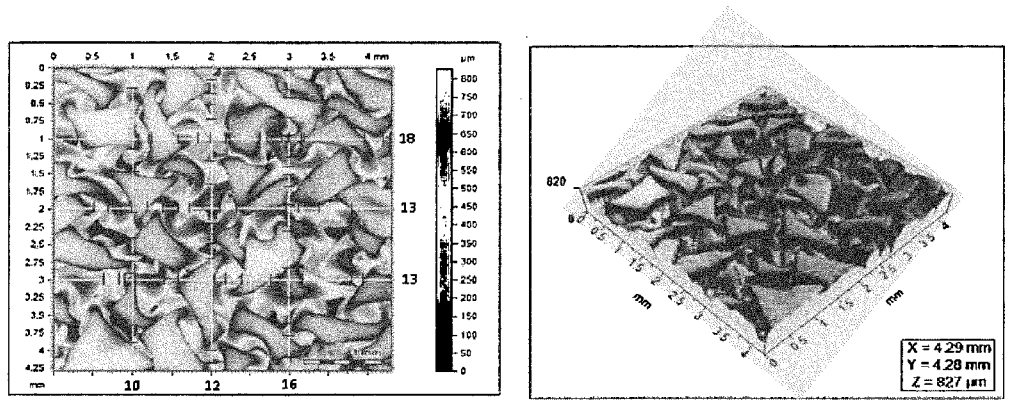

In FIG. 13, the determination of the structure density of the film of Example 1D is shown (left hand image). In the right hand image, a surface topography of the film is shown.

Figure 14:
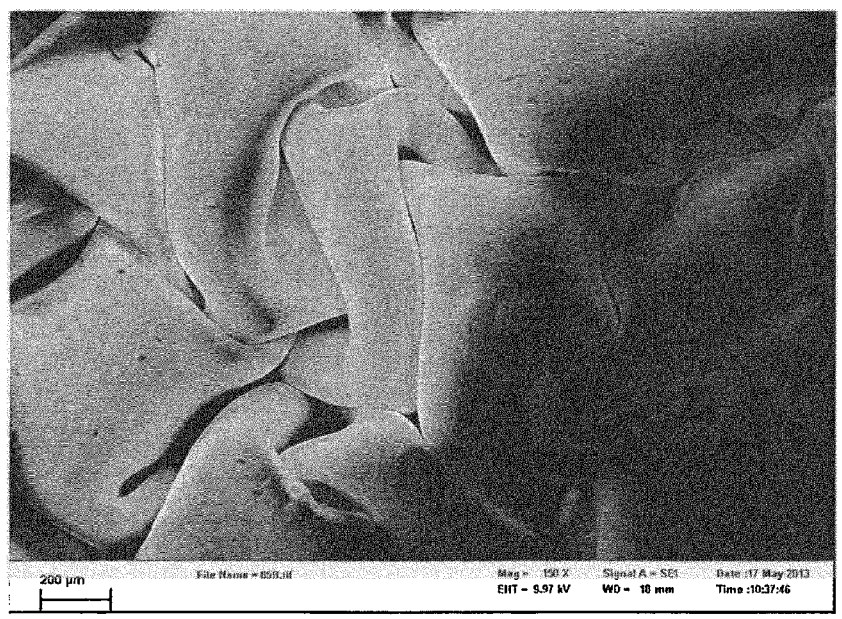

FIG. 14 is a SEM image (top view) of the structured film of Example 1E.

Figure 15:
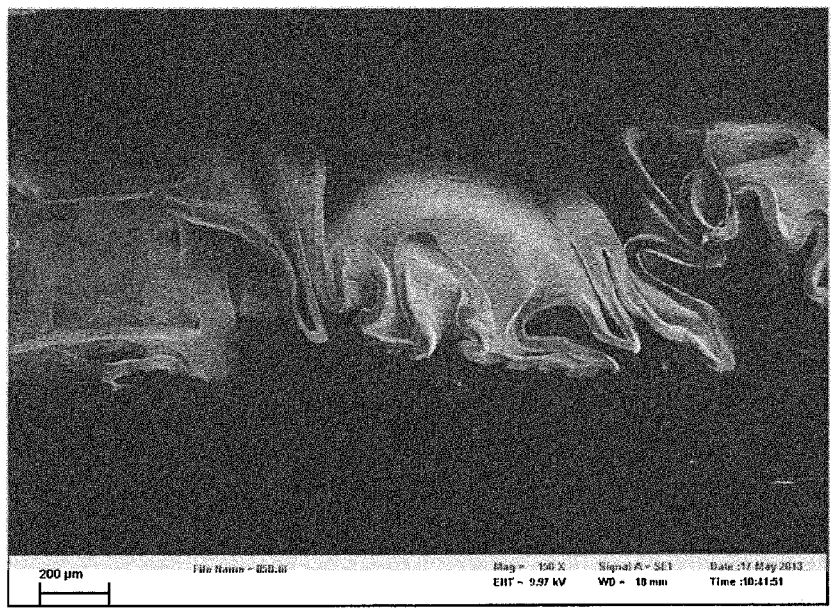

FIG. 15 is a SEM image showing a side view of the structured film of Example 1E which is supported on a backer material.

Figure 16:
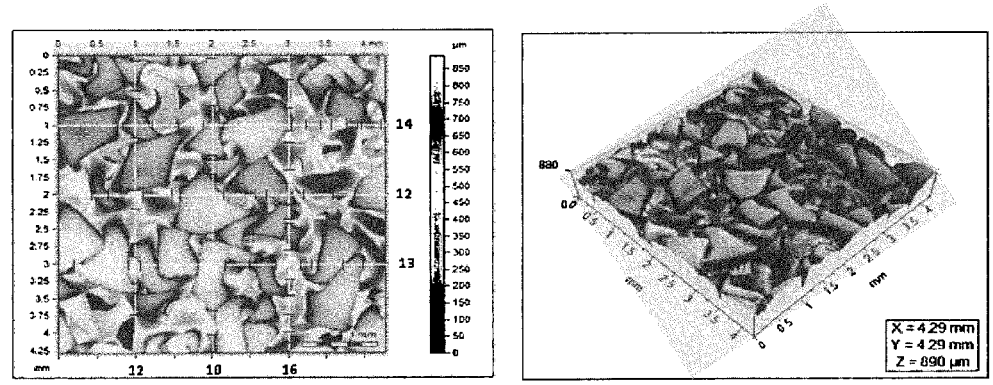

In FIG. 16, the determination of the structure density of the film of Example 1E is shown (left hand image). In the right hand image, a surface topography is shown.

Figure 17:
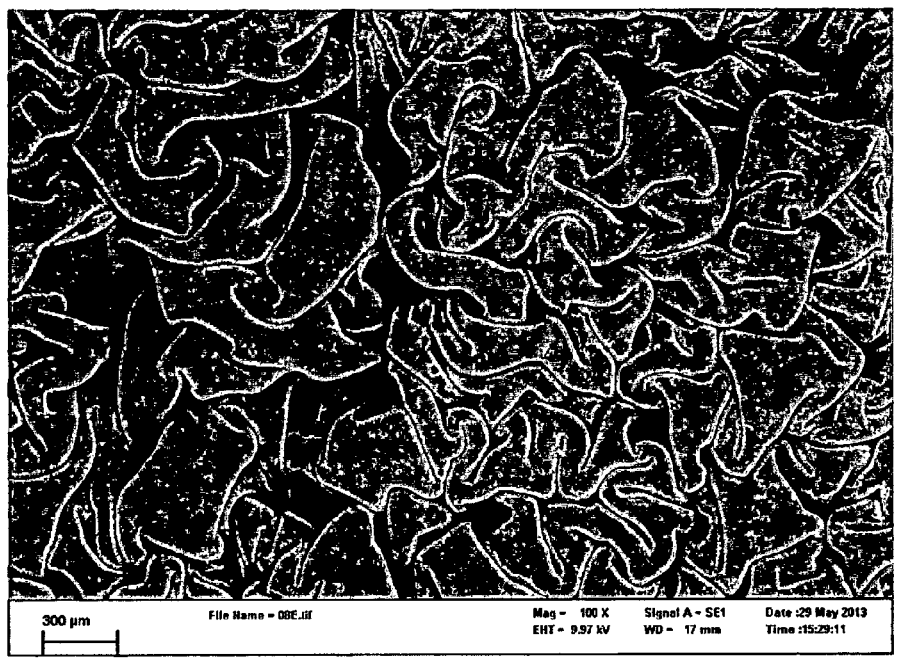

FIG. 17 is a SEM image (top view) of the structured film of Example 1F.

Figure 18:
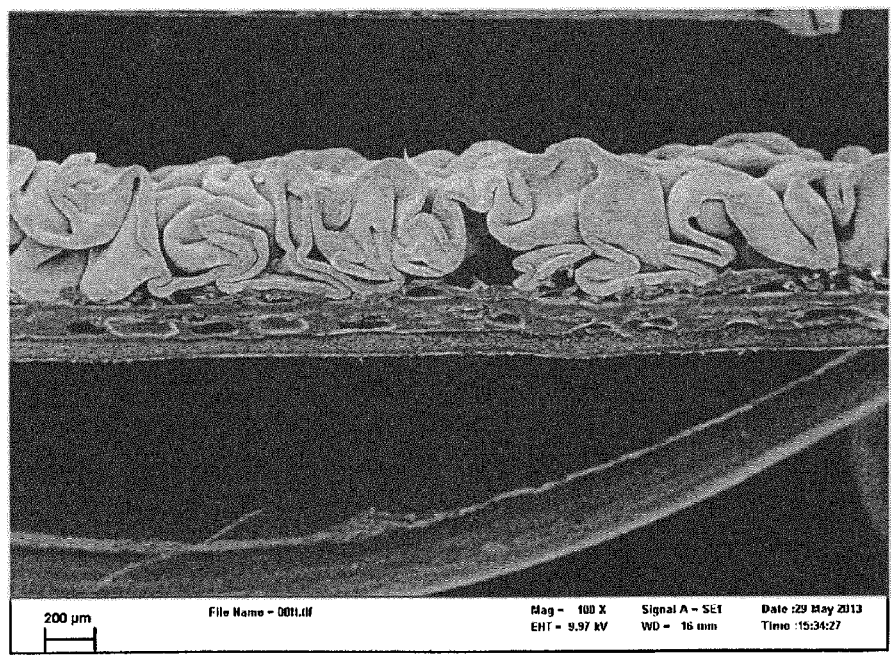

FIG. 18 is a SEM image showing a side view of the structured film of Example 1F which is supported on a backer material.

Figure 19:
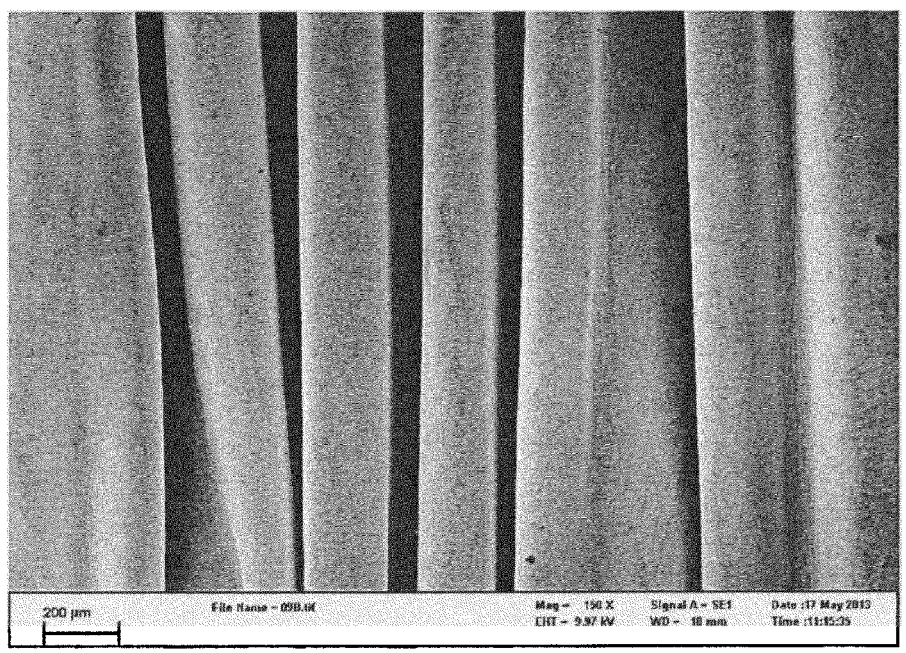

FIG. 19 is a SEM image (top view) of the structured film of Example 1G.

Figure 20:
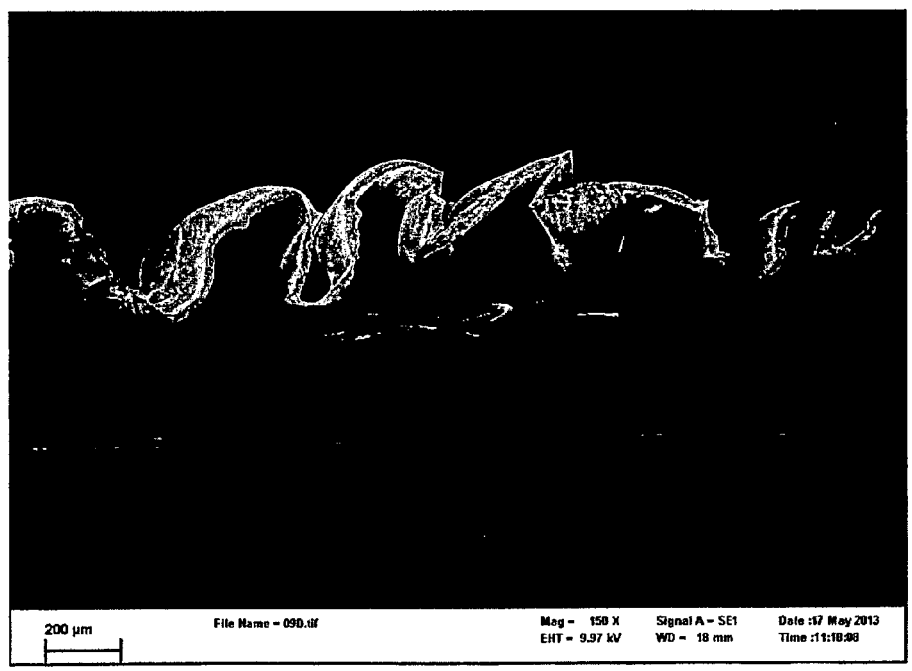

FIG. 20 is a SEM image showing a side view of the structured film of Example 1G which is supported on a backer material.

Figure 21:
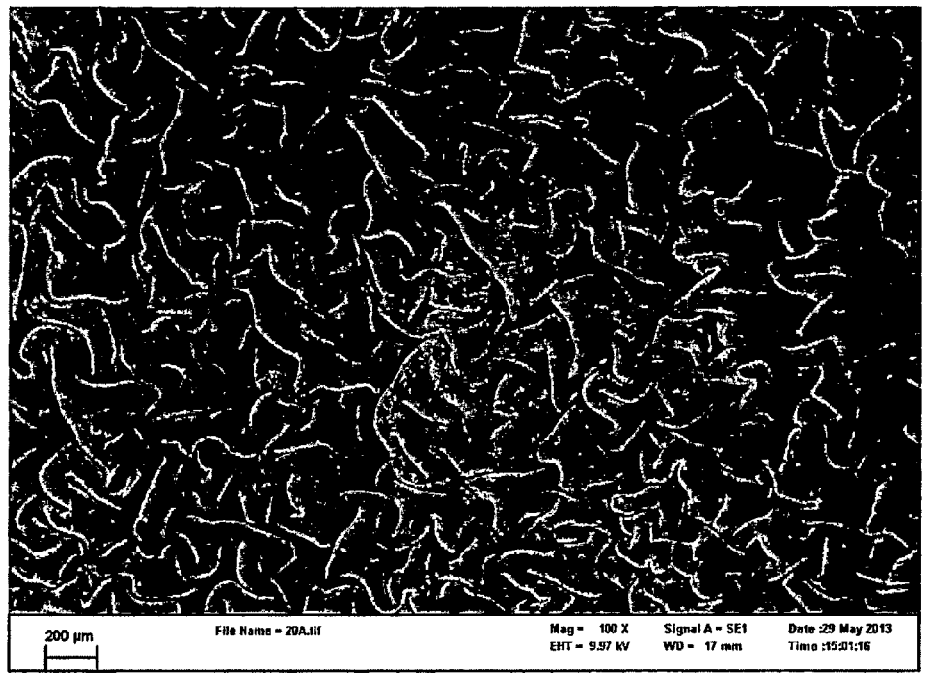

FIG. 21 is a SEM image (top view) of the structured film of Example 1H.

Figure 22:
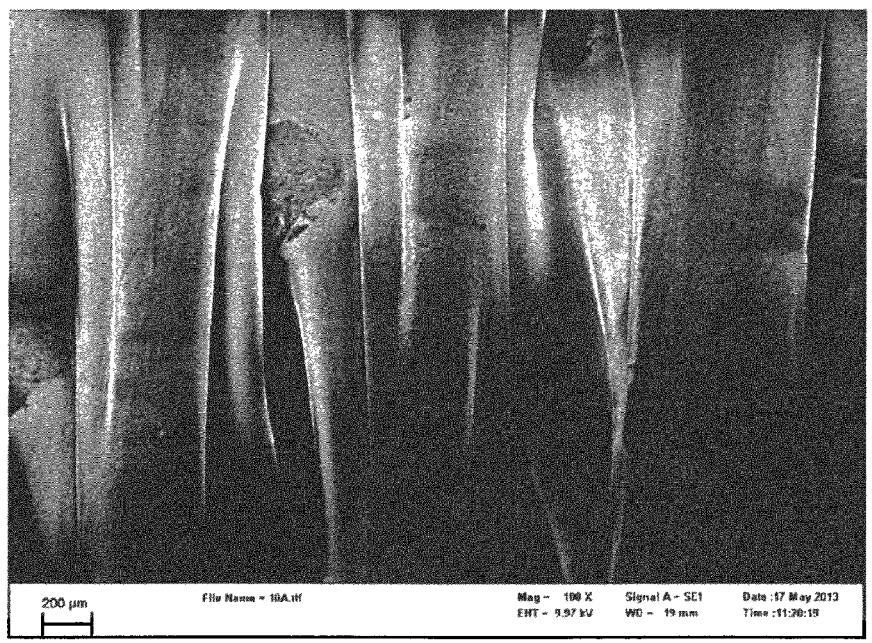

FIG. 22 is a SEM image (top view) of the structured film of Example 1I.

Figure 23:
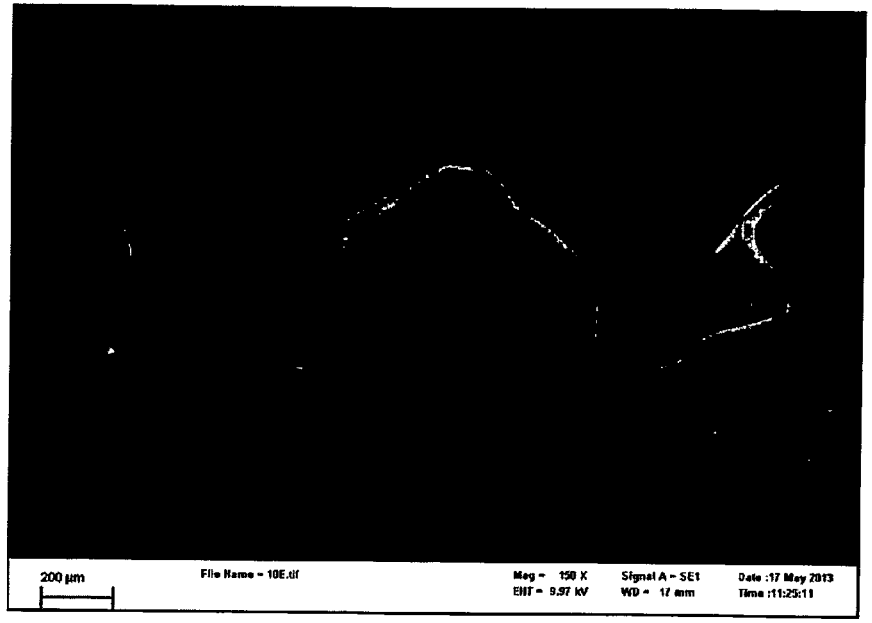

FIG. 23 is a SEM image showing a side view of the structured film of Example 1I which is supported on a backer material.

Figure 24:
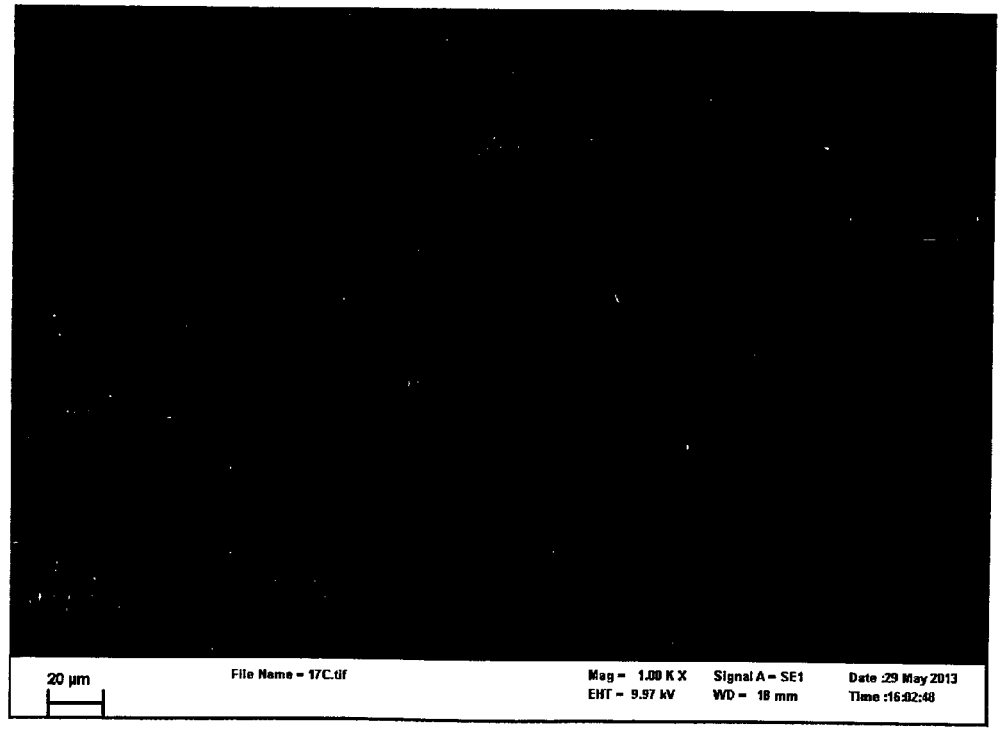

FIG. 24 is a SEM image (top view) of the film of reference Example 2A.

Figure 25:
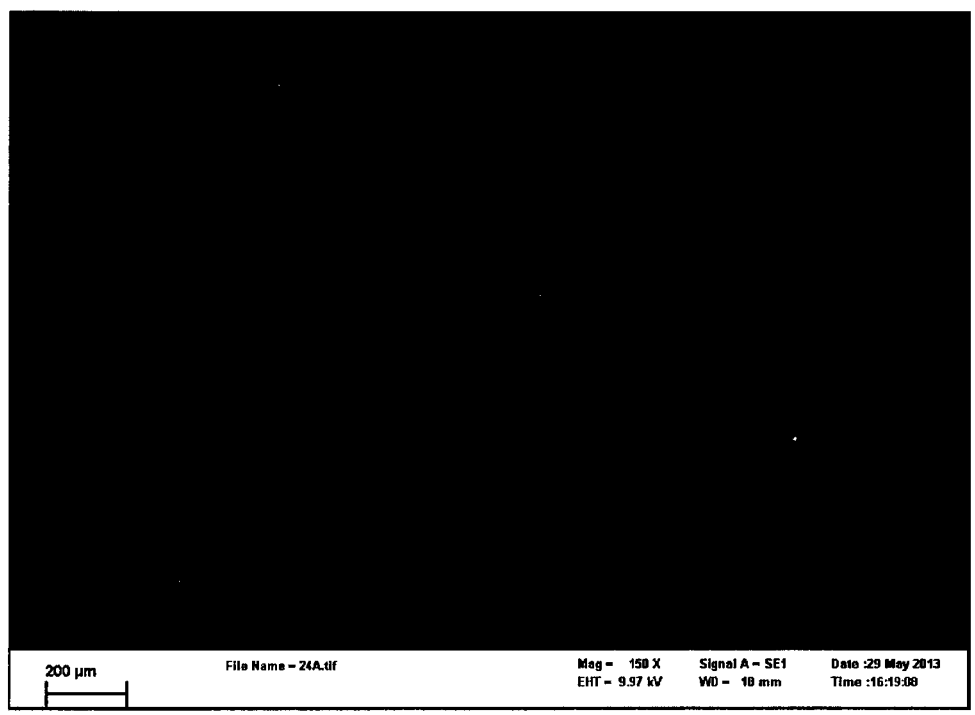

FIG. 25 is a SEM image (top view) of the structured film of Example 2B.

Figure 26:
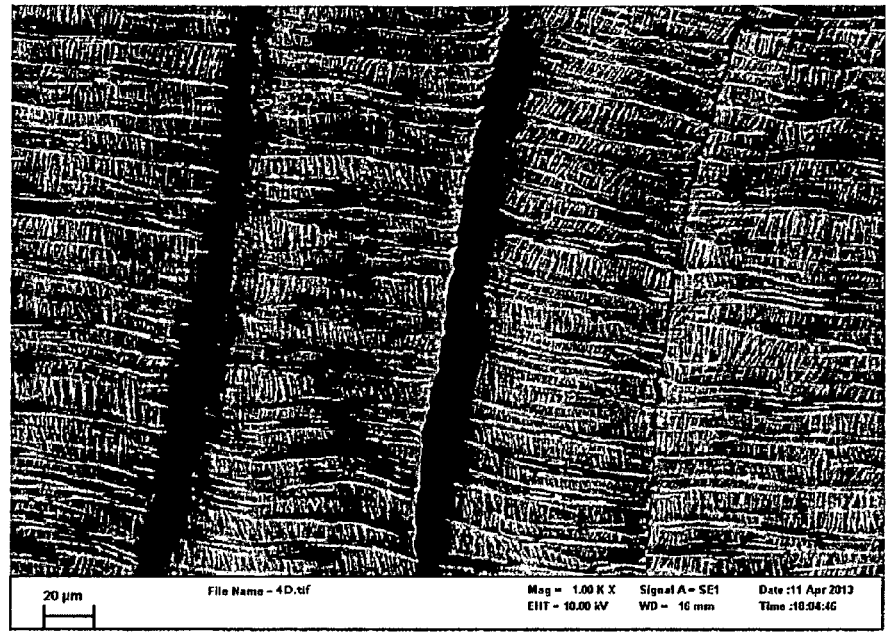

FIG. 26 is a SEM image (top view) of the structured film of Example 2C.

Figure 27:
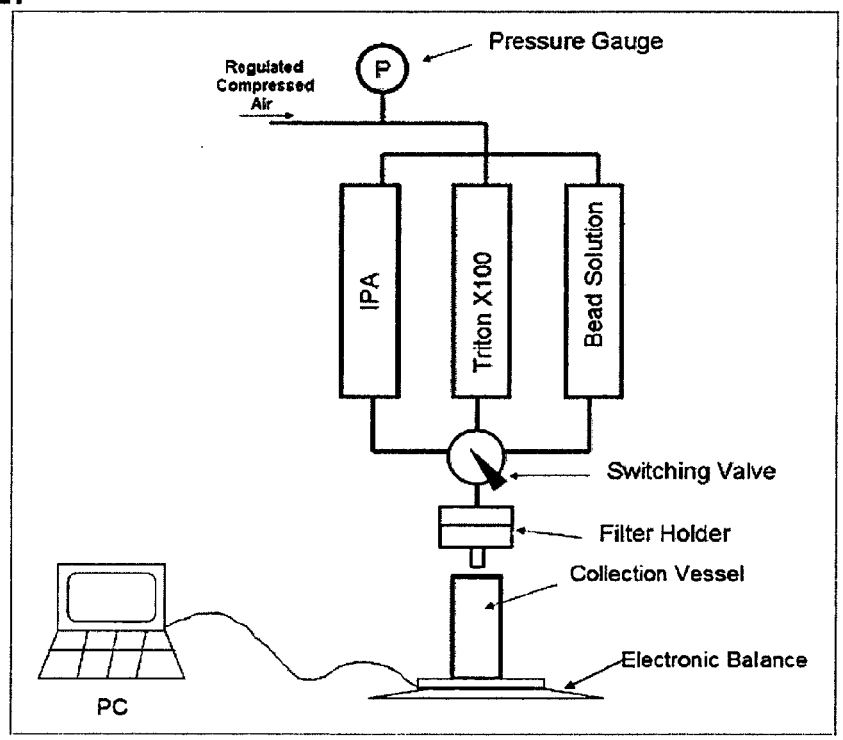

FIG. 27 is a scheme of the experimental set-up for filtration Example 4.

Figure 28:
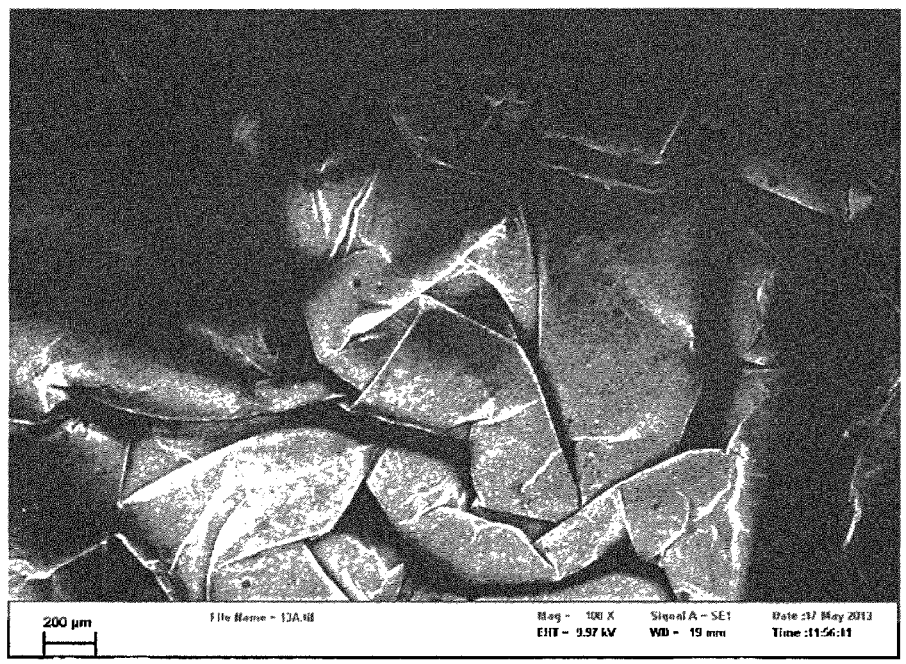

FIG. 28 is a SEM image (top view) of the structured film of Example 6B.

Figure 29:
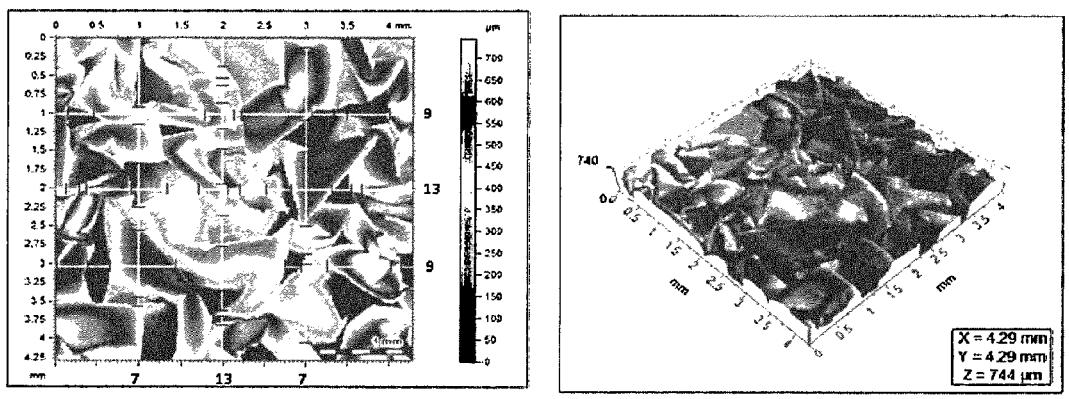

In FIG. 29, the determination of the structure density of the film of Example 6B is shown (left hand image). In the right hand image, a surface topography of the film is shown.

Figure 30:
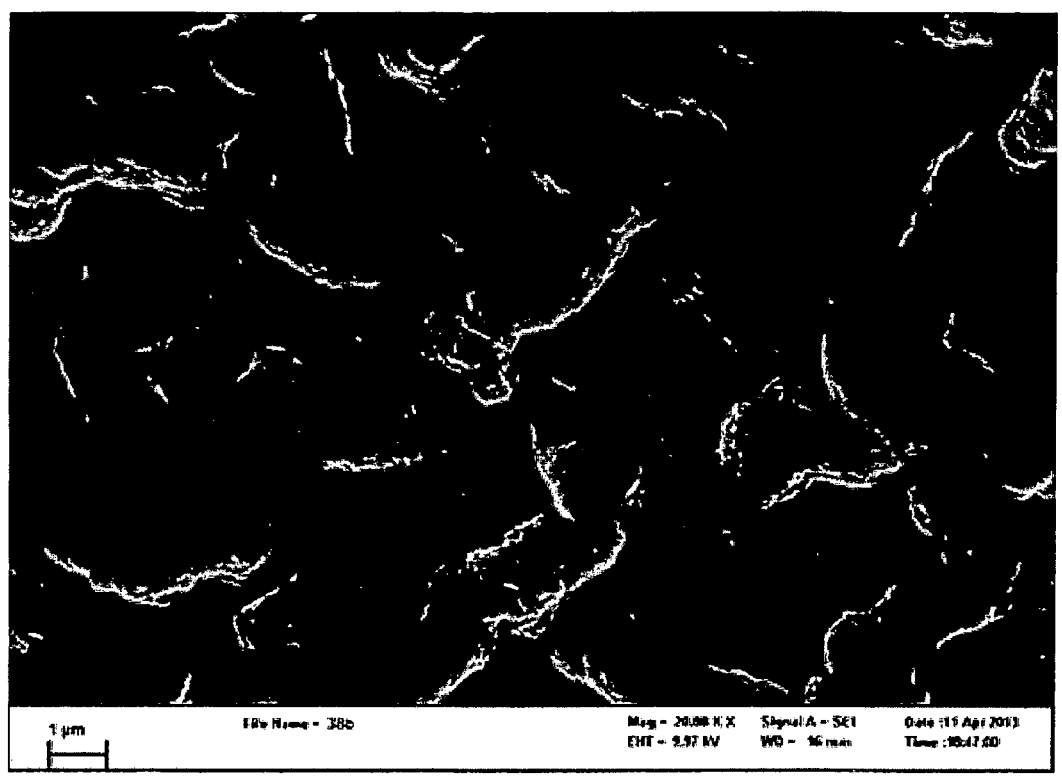

FIG. 30 is a SEM image (top view) of the structured film of Example 3.

MEASUREMENT METHODS a) Rigidity Measurements

Rigidity of the porous films may be measured according to ASTM D-2923-08, procedure B. Although this method is indicated to be suitable for polyolefin film, it may also be used for films made of other materials.

For measuring the rigidity, a Handle-O-Meter test device (Thwing-Albert Instrument Company) may be used.

b) ATEQ Airflow

Airflow is measured using an ATEQ airflow meter at a pressure of 70 mbar.

c) Gurley Number

Gurley numbers [s] were determined using a Gurley Densometer according ASTM D 726-58.

The results are reported in terms of Gurley Number which is the time in seconds for 100 cubic centimeters of air to pass through 6.54 cm$^2$ of a test sample at a pressure drop of 1.215 kN/m$^2$ of water.

d) Structure Height

Topography images were created with an areal confocal 3d measurement system "µsurf explorer" (Nanofocus AG). Such topographic images are e.g. given on the right hand side of FIGS. 10, 13, 16, and 30.

The height of the structures is the maximum distance between a height peak and a height dip (valley) of a representative sample evaluated via image analysis.

e) Structure Density

To determine the structure density in x (e.g. transverse) direction and y (e.g. longitudinal or machine) direction, 3D topography or SEM images were analysed. Multiple measurements per axis are made and averaged out to determine structure density in perpendicular directions x and y.

Lines in x and y directions were applied on the images. All structure edges crossing a line were marked. Multiple measurements were taken and averaged. This procedure is depicted in the left hand side pictures of FIGS. 10, 13, 16, and 30.

The structure density where evaluated using following formula: (As 2 edges define one structure, the average edge number is divided by 2)

Structure density in direction x=(average number of edges x/2)/evaluated sample width x Structure density in direction y=(average number of edges y/2)/evaluated sample width y For example, this procedure yields for the structured film of Example 1E as shown in FIG. 13, left hand side, the following structure densities:

Direction x: (18+13+13)/3/2/4.29 mm=1.5/mm
Direction y: (10+12+16)/3/2/4.28 mm=1.5/mm f) Further Properties Further properties, such as bubble point, water entry pressure, pore size, and porosity, were measured as indicated in US 2007/0012624, unless otherwise indicated.

EXAMPLES

A) Device

Example D1

Figure 1:
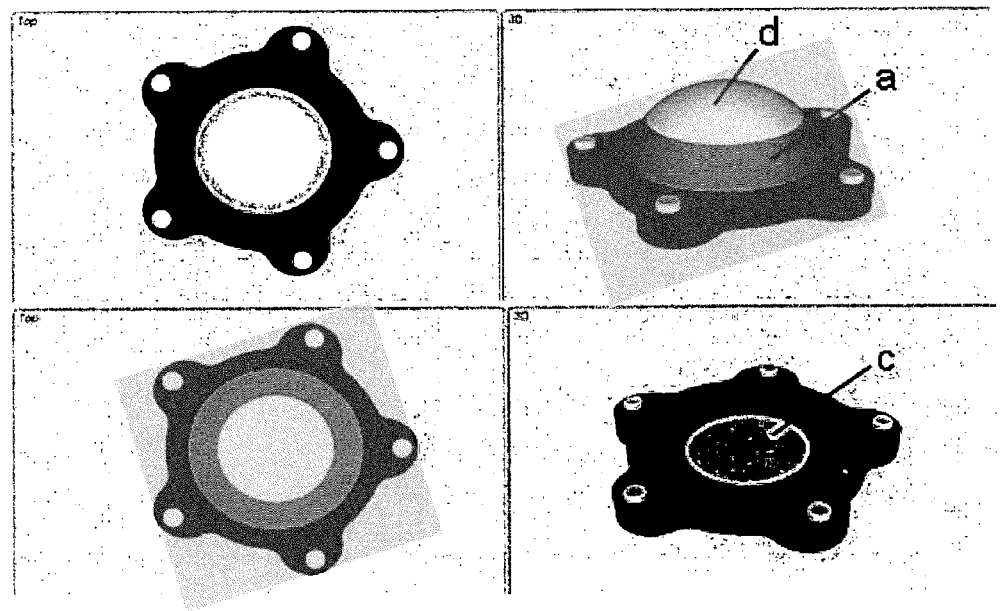

FIG. 1 shows a typical and simple device for carrying out the process of the invention and obtaining the structured porous film of the invention in a non-continuous manner, wherein an elastic carrier (a) is inflated to stretch the elastic carrier (a) and a film (d) is applied at a stretched state. The inner pressure is reduced by opening a valve and so that the substrate is relaxed and, thereby, the structured film (c) is formed on the elastic carrier (a).

Example D2

Figure 2:
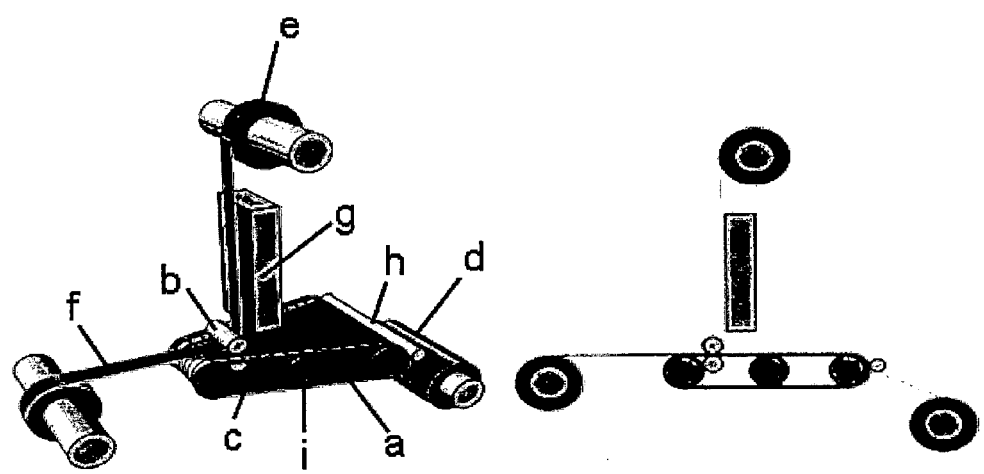
FIG. 2 shows a schematic drawing of a first embodiment of a device for performing the process of the invention involving transverse uniaxial stretching in a continuous manner.

FIG. 2 shows a schematic illustration of a further embodiment of a continuous processing method and device of the invention wherein an rotatable elastic carrier belt (a) is fixed to two rotating elements that induce and release transverse stretch to the silicone substrate along a circular motion. A film (d) is applied via pressure roll (h) on the stretched elastic carrier belt (a). The film moves on the stretched elastic carrier belt (a) and a structured film (c) is formed during relaxation of the elastic carrier belt (a). Optionally, a backer material (e) is preheated with e.g. an IR heater (g) and applied via pressure roll (b) on the structured film (c) to form a composite (f) comprising a structured film (c) and a backer material (e).

Example D3

Figure 3:
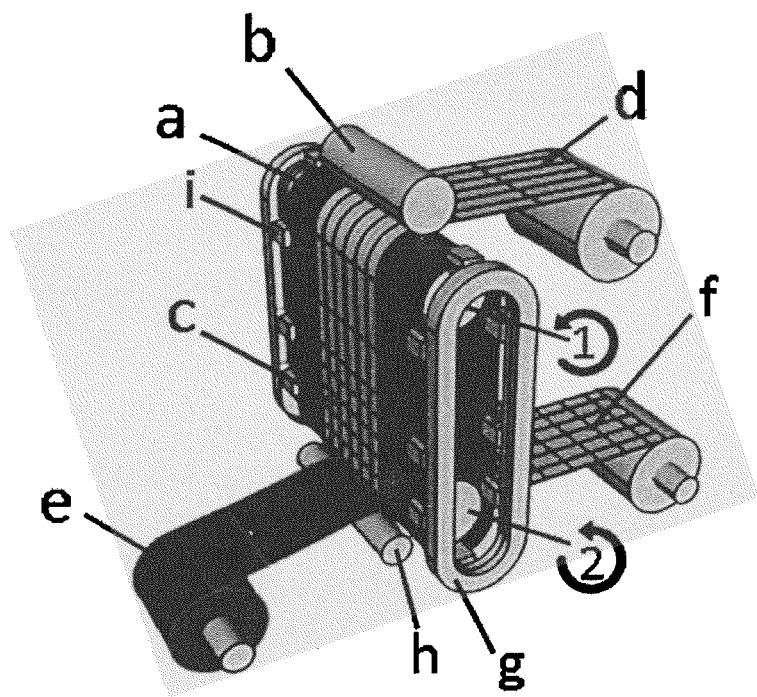
FIG. 3 shows a schematic drawing of a first embodiment of a device for performing the process of the invention involving uni- or biaxial stretching in a continuous manner.

FIG. 3 shows a schematic illustration of a further embodiment of a continuous processing method and device of the invention wherein a rotatable elastic carrier belt (a) rotates between two rolls with a surface velocity ratio.

To induce stretch in the elastic carrier (a) the surface velocity of roll 2 is lower than surface velocity of roll 1. This ratio causes the elastic carrier belt (a) to change its stretch state from relaxed to stretched during rotation. The elastic carrier (a) is fixed on the sides with clamps (i) that run in a rail (g) so that they can change their distance depending on the stretch ratio in the elastic carrier (a) where they are fixed to while keeping the elastic carrier (a) at a constant width.

In another version of this process the rails (g) form an angle so that the elastic carrier belt (a) is in addition to the longitudinal stretch, stretched in the transverse direction with changing its width repeatable during rotation.

A film (d) is applied on the stretched elastic carrier via pressure roll (b).

A structured film (c) is formed on the elastic carrier (a). A backer material (e) is provided and laminated to the structured film (c) on the elastic carrier (a) via pressure roll (h) to form a composite material (f) comprising the structured film (c).

Example D4

Figure 4:
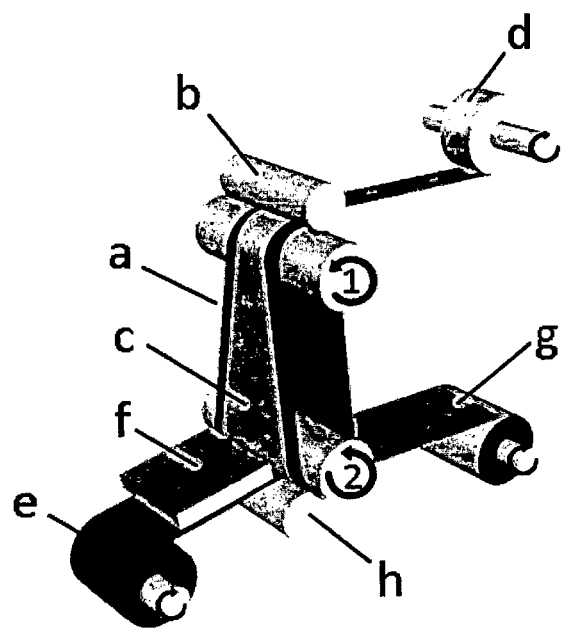
FIG. 4 shows a schematic drawing of a first embodiment of a device for performing the process of the invention involving biaxial stretching in a continuous manner.

FIG. 4 shows a schematic illustration of a further embodiment of a continuous processing method and device of the invention wherein a rotatable elastic carrier belt (a) rotates between two rolls with a surface velocity ratio.

To induce stretch in the elastic carrier (a) the surface velocity of roll 2 is lower than surface velocity of roll 1. This ratio causes the elastic carrier belt (a) to change its stretch state from relaxed to stretched during rotation.

A film (d) is applied on the stretched elastic carrier via pressure roll (b).

A structured film (c) is formed on the elastic carrier (a). A backer material (e) is provided and preheated with an IR heater (f) to melt an adhesive component and laminated to the structured film (c) on the elastic carrier (a) via pressure roll (h) to form a composite material (g) comprising the structured film (c).

The elastic carrier (a) and consequently the film (d) in this process are contracted in the machine direction while an expansive force acts in the transverse direction depending on the Poisson's ratio of the elastic carrier material.

Example D5

Figure 5:
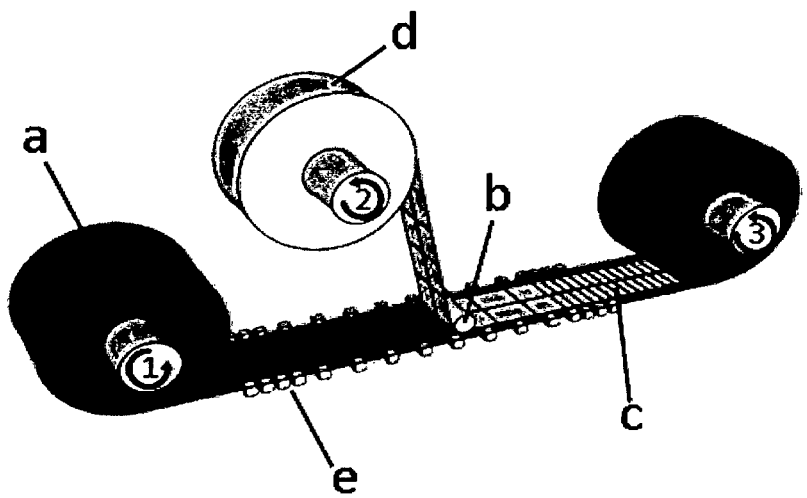
FIG. 5 shows a schematic drawing of a first embodiment of a device for performing the process of the invention involving uniaxial stretching in a continuous manner.

FIG. 5 shows a schematic illustration of a further embodiment of a continuous processing method and device of the invention wherein a roll of elastic carrier material (a) is provided. The roll is at least stretched in one direction, before the film (d) is applied with a pressure roll (b). In this case the elastic carrier is hold by clamps (e) on the sides and the clamps increase their distance in the machine direction to stretch the elastic carrier. After applying the film the stretch is released. A structured film (c) is formed on the elastic carrier. The clamps release the elastic carrier at the end of the process.

As shown in the image the elastic carrier with the structured film is spooled on a roll. This roll can then be used for further processes, e.g. a coating step, after which the elastic carrier is removed from the coated structured film. Another method would be to remove the structured film from the elastic carrier before the elastic carrier is spooled on a roll.

Example D6

Figure 6:
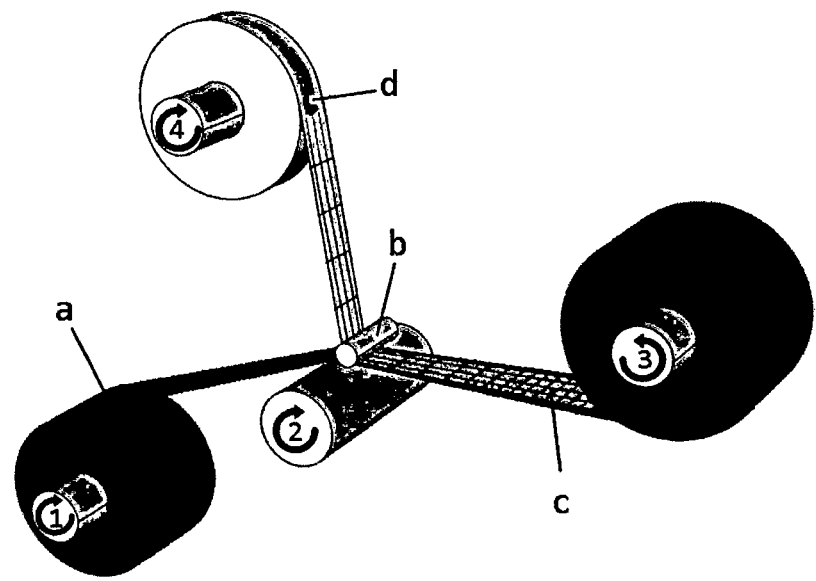
FIG. 6 shows a schematic drawing of a second embodiment of a device for performing the process of the invention involving uniaxial stretching in a continuous manner.
Figure 7:
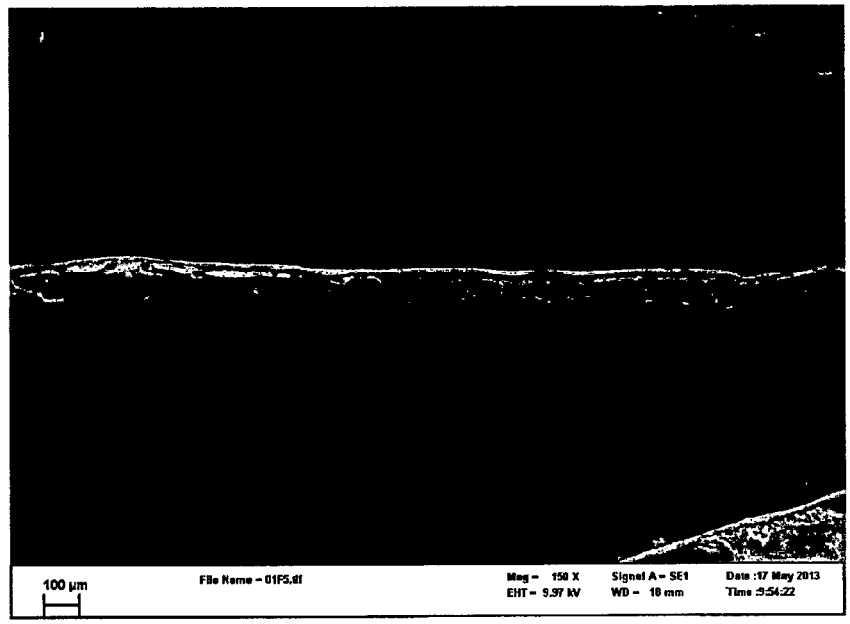
FIG. 7 shows a SEM image of a side view of the film of Comparative Example 1A.
Figure 8:
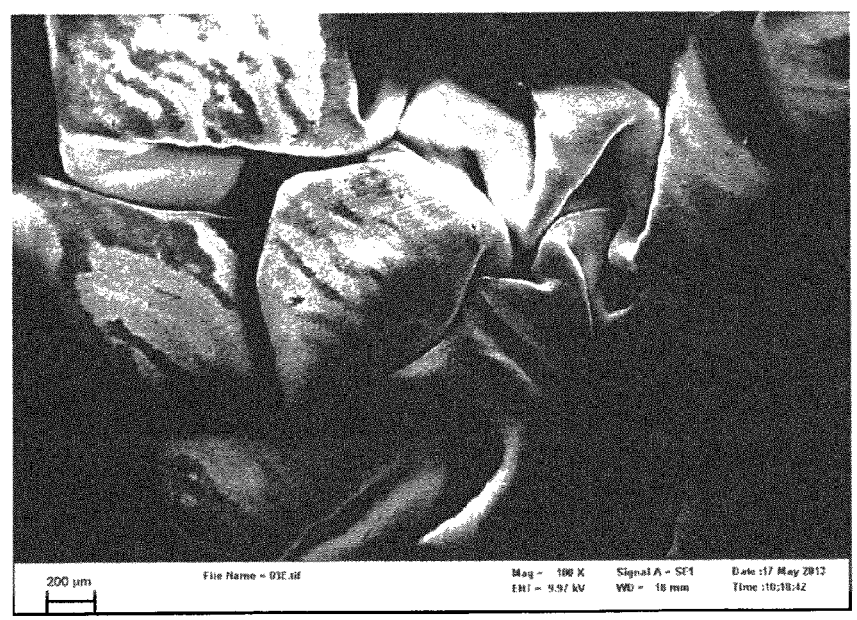
FIG. 8 shows a SEM image (top view) showing the structures of the film of Example 1C.
Figure 9:
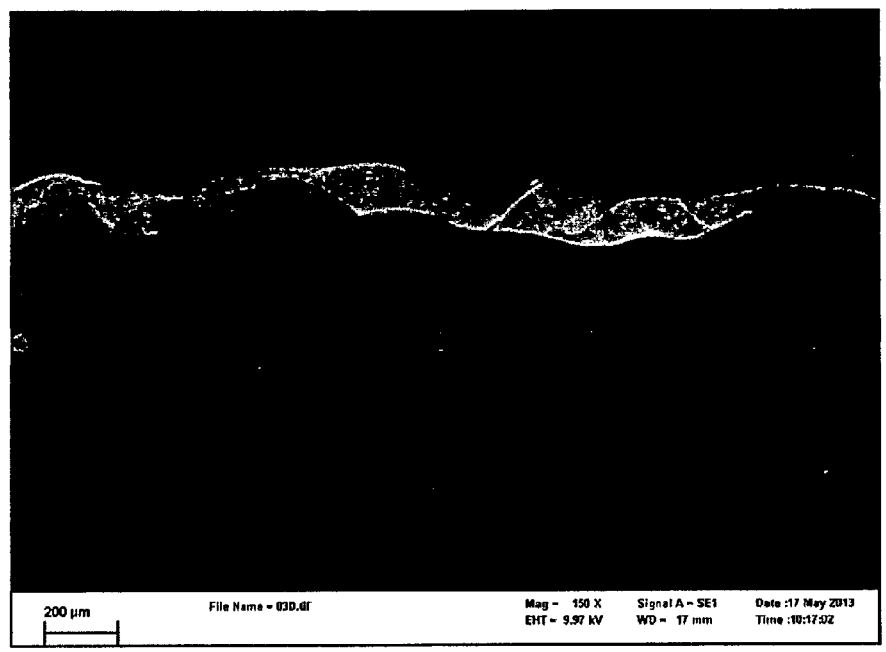
FIG. 9 shows a SEM image showing a side view of Example 1C. The structured porous film is supported on a backer material.

FIG. 6 shows a schematic illustration of a further embodiment of a continuous processing method and device of the invention wherein a roll of elastic carrier material (a) is provided. The roll is stretched in machine direction, before the film is applied. A ratio between the surface velocity of roll 1 and roll 2 stretches the elastic carrier (a). A film (d) is applied on the stretched elastic carrier via pressure roll (b). The stretch is released, with roll 3 having a lower surface velocity than roll 2, to form a structured film (c). Usually surface velocity of roll 1 equals approximately the surface velocity of roll 1. The elastic carrier (a) and consequently the film (d) in this process are contracted in the machine direction while an expansive force acts in the transverse direction depending on the Poisson's ratio of the elastic carrier material.

B) Process/Structured Porous Films

In the following examples, a Bicomponent Copolyester Spunbond was used as "standard backer material". To adhere the backer material to the membrane samples a polyurethane hot melt web adhesive (Article Number: D6C8F 10 g/m$^2$; Company: Protechnic (France)) was used. The web adhesive was pre-applied to the backer material in a heat press at 120° C. and 5 psi (0.34 bar) areal pressure at 15 seconds dwell time.

Example 1

An ePTFE membrane was made by processes known in the art, for example U.S. Pat. No. 3,953,566. The membrane had an average matrix tensile strength of 10 N/mm$^2$ in machine direction and 25 N/mm$^2$ in transverse direction, an airflow of 8 Gurley seconds, a bubble point of 1.5 bar, a thickness of 35 μm, mass/area of 17 g/m$^2$, and mean flow pore size of 0.18 μm.

Reference Example 1A (Not Structured)

The membrane was placed on a sheet of 1 mm Elastosil RT620 silicone (Wacker silicones). Component A and B where mixed and poured onto a 15 cm by 40 cm rectangular glass plate with 1 mm thick aluminum profiles at the edges. A small glass plate was moved on the aluminum profiles to evenly distribute the silicone on the glass plate to obtain a 1 mm thick sheet after 3 hour curing time at room temperature.

The backer material with pre-adhered adhesive layer was placed on top of the membrane, the adhesive layer facing towards the membrane. A 10 mm thick, 150 mm diameter silicone sheet (Elastosil RT620) was preheated in an oven to reach 150° C. The upper silicone sheet was placed on top of the backer material. An aluminium rod with a diameter of 80 mm and a mass of 5 kg was placed on top of the upper silicone sheet for 10 s to create a bond between the membrane sample and the backer material.

After 10 s the rod and upper silicone sheet were removed and the sample was cooled for 3 min before removing from the lower silicone sheet material.

Examples 1B-1E

Biaxial Processing:
The elastic substrate of a device according to FIG. 1 is stretched to the desired processing ratio with air inflation. The processing ratio is given in Table 1 below.

After reaching the desired stretched state, a valve is closed to keep the processing ratio on a constant state. The film sample is applied on the stretched elastic substrate and a force is applied with a rubber roller to adhere the film sample to the elastic substrate.

After sufficient adhesion is achieved, the air valve is opened to release the inner pressure that stretches the elastic substrate.

A typical processing time was 3 seconds for Elastosil RT620 inflated to a processing ratio of 200%. The elastic-substrate retracts back to its original unstretched, flat shape.

The adhered film retracts with the elastic substrate, but is structured after the process.

A standard backer material was applied in the same manner as in Reference Example 1.

Examples 1B to 1E show variations in the processing ratio of the elastic substrate and therefore variations in the amount of retraction on the elastic substrate and consequently on the retracted film.

Example 1F, 1H and 1I

For Examples 1F, 1H and 1I in addition structuring of the film has been done by using elastic substrates which a structured surface, which is in the following denoted as "microstructure 1", "microstructure 2", and "microstructure 3", respectively.

For this purpose, the film to be stretched was placed on a sheet comprising microstructured surfaces which were produced as described below:

Microstructure 1

Mold surface was covered with Sandpaper P180 (grit size after FEPA (European Federation of Abrasive Producers) norm), Art.-Nr.: 2871000 "Bogen Schleifpapier Nass-/Trocken" from Wolfcraft GmbH.

Examples 1G and 1I

Continuous Transverse Processing:

The membrane sample was placed on a continuous rotating belt of 2 mm thickness.

In Example 1G ECOFLEX 0010 silicone having a smooth, non-patterned surface (Smooth on, Inc.) was used as elastic substrate. Component A and B where mixed and poured onto a 15 cm by 80 cm rectangular glass plate with 2 mm thick aluminum profiles at the edges. A small glass plate was moved on the aluminum profiles to evenly distribute the silicone on the glass plate to obtain a 1 mm thick sheet after 3 hour curing time at room temperature.

In Example 1I Elastosil RT 620 silicone with a dot surface microstructure was used as substrate.

The substrate sheet was clamped in rotating system that stretches and releases stretch of the silicone sheet along a circular motion as described in Example D2. A roll of the standard backer material with pre-adhered adhesive (polyurethane hot melt web adhesive) layer was provided and pre-heated to 130° C. with heated air and then pressed onto the structured film with a pressure roll to form a composite.

Properties of the films of Examples 1A to 1I are given in Table 1.

TABLE 1

| | Example 1A (ref.) | Example 1B | Example 1C | Example 1D | Example 1E | Example 1F | Example 1G | Example 1H | Example 1I |
|---|---|---|---|---|---|---|---|---|---|
| processing type | — | biaxial | biaxial | biaxial | biaxial | biaxial | transverse | biaxial | transverse |
| Processing ratio (%) | 100 | 125 | 150 | 200 | 300 | 200 | 200 | 200 | 200 |
| processing temp. (° C.) | 20 | 20 | 20 | 20 | 20 | 20 | 20 | 20 | 20 |
| elastic substrate | — | Elastosil RT620 | Elastosil RT620 | Elastosil RT620 | Elastosil RT620 | Elastosil RT620 | ECOFLEX 0010 | Elastosil RT620 | Elastosil RT620 |
| elastic substrate surface | — | smooth | smooth | smooth | smooth | Microstructure 1 | smooth | Microstructure 2 | Microstructure 3 |
| airflow ATEQ - up (l/h) | 32.40 | 11.80 | 40.10 | 58.70 | 105.90 | 85.70 | 55.20 | 57.50 | 42.20 |
| airflow ATEQ - down (l/h) | 33.40 | 10.80 | 43.10 | 67.00 | 101.80 | 51.70 | 54.60 | 56.20 | 24.90 |
| structure height (μm) | — | 204 | 681 | 827 | 890 | 551 | 301 | 334 | 466 |
| structure density, direction x | — | — | 1.4/mm | 1.7/mm | 1.5/mm | 2.5/mm | 3.1/mm | 3.3/mm | 0.8/mm |
| structure density, direction y | — | — | 1.5/mm | 1.5/mm | 1.5/mm | 2.5/mm | 0.0/mm | 3.3/mm | 0.8/mm |
| Area increase factor (calc. from proc. ratio(s)) | 1 | 1.6 | 2.25 | 4 | 9 | 4 | 2 | 4 | 2 |

Microstructure 2

Mold surface was covered with Sandpaper Vitex P60 (grit size after FEPA (European Federation of Abrasive Producers) norm), Art.-Nr.: KK114F VSM from Vereinigte Schmirgel- and Maschinen-Fabriken AG.

Microstructure 3

Cast silicone surface was covered with micropunched Polyethylen film to create a microstructured surface.

A standard backer material was applied in the same manner as in Reference Example 1.

Example 2

An ePTFE membrane was made by processes known in the art for example U.S. Pat. No. 5,814,405 or DE 69617707. The membrane had an average ATEQ airflow of 54 l/hr (at 12 mbar test pressure), a WEP (Water Entry Pressure) of 28 psi (1.93 bar), a bubble point of 8.2 psi (0.57 bar), an average Gurley number of 2.8 Gurley seconds and a mass/area of 10 g/m$^2$. The membrane had an average transverse direction rigidity of 29.7 g/m and average machine direction rigidity of 9.8 g/m, measured according to ASTM D2923-08 Method B, using a Handle-O-Meter test device (Thwing-Albert Instrument Company) at 20° C.

In this example, the standard backer material was applied in the same manner as in Reference Example 1. In Examples 2B and 2C, different processing types as indicated have been used. Results are given in Table 2 below.

TABLE 2

|  | Example 2A (reference) | Example 2B (inventive) | Example 2C (inventive) |
|---|---|---|---|
| processing type | — | biaxial | transverse |
| Processing ratio (%) | 100 | 200 | 200 |
| processing temperature (° C.) | 20 | 20 | 20 |
| elastic substrate | — | Elastosil RT620 | ECOFLEX 0010 |
| elastic substrate surface | — | smooth | smooth |
| airflow ATEQ - up (l/h) | 94.50 | 28.70 | 138.00 |
| airflow ATEQ - down (l/h) | 92.80 | 27.60 | 136 |
| Structure height (μm) | — | 144 | 169 |
| Structure density direction x | — | 4.4/mm | 7.5/mm |
| Structure density direction y | — | 0.6/mm | 0.0/mm |

Example 3

An ePTFE membrane was made by processes known in the art, for example in US 2007/0012624 A1. The membrane had an average max load of 6N in machine direction and 7N in transverse direction and an average mass/area of 0.3 g/m$^2$.

The elastic substrate used was Elastosil RT620 and had a thickness of 250 μm. The substrate was stretched to a processing ratio of 200%. There was no visible structuring occurring in the sample. The sample was directly transferred to a pressure sensitive electrical conductive tape to examine the resulted structure in SEM analysis.

The determined structure density in direction x was 270.8/mm, and in direction y was 354.2/mm. As, thus, the structure density is very high, this explains why no visible structures could be seen on the sample.

Example 4—Filtration Examples

Example 4A

A three layer composite ePTFE membrane was made by processes described in U.S. Pat. No. 7,306,729. The composite membrane had an average matrix tensile strength of 13798 (PSI) (95.1 MPa) an ATEQ airflow of 74.9 L/h, a bubble point of 34.8 psi (2.34 bar), a porosity of 81%, a thickness of 1.6 mil, mass/area of 16.7 g/m$^2$, and pore size of 0.147 microns. This membrane was rendered hydrophilic and water wettable by coating with polyvinyl alcohol by processes known in the art such as those described in U.S. Pat. No. 5,874,165.

Example 4C

A monolithic ePTFE membrane was made by processes known in the art for example U.S. Pat. No. 3,953,566 or U.S. Pat. No. 5,814,405. The membrane had an average matrix tensile strength of 18726 (PSI) (129.1 MPa), an ATEQ airflow of 10.2 L/h, a bubble point of 32 psi (2.21 bar), a porosity of 88%, a thickness of 1.99 mil, mass/area of 13 g/m$^2$, and mean flow pore size of 0.184 microns.

Preparation of the Structured Film of Examples 4A and 4C

The elastic substrate (ECOFLEX 0030) of a device shown in FIG. 1 was stretched to a processing ratio of 200% for Example 4A and 150% for Example 4C with air inflation.

After reaching the desired stretch ratio a valve was closed to keep the stretch ratio on a constant state. The film sample of Example 4A was applied on the elastic substrate and a force is applied with a rubber roller to adhere the film sample to the elastic substrate.

After sufficient adhesion was achieved the air valve was opened to release the inner pressure that stretches the elastic carrier. Therefore the elastic substrate retracts back to its original flat shape. The adhered sample retracts with the elastic substrate, and was structured after the process.

A polypropylene Fiberweb was used as backer material for the structured film. To adhere the backer material to the structured film samples, a polyurethane hot melt web adhesive (Article Number: D6C8F 10 g/m$^2$; Company: Protechnic (France)) was used. The web adhesive was pre-applied to the backer material in a heatpress at 120° C. and 5 psi (0.34 bar) areal pressure at 15 seconds dwell time.

The film of Example 4C was processed in the same way as that of Example 4A. In Example 4A, in addition, an acrylic glass plate was laid on top of the film during retraction to guide more uniform wrinkle formation.

Comparative Examples 4B and 4D

For Comparative Examples 4B and 4D the membranes of Examples 4A and 4C, respectively, were placed on a non-stretched 2 mm thick sheet of ECOFLEX 0030 silicone (Smooth on, Ltd.). Component A and B are mixed and poured onto a 15 cm by 40 cm rectangular glass plate with 2 mm thick aluminum profiles at the edges. A small glass plate was moved on the aluminum profiles to evenly distribute the silicone on the glass plate to obtain a 2 mm thick sheet after 3 hour curing time at room temperature.

The backer with pre-adhered adhesive layer was placed on top of the film, the adhesive layer facing towards the membrane. Pressure was applied with a mechanical heatpress at 130° C. for 15 s dwell time to create a bond between the film and the backer material. After 3 min cooling the sample was removed from the silicone carrier.

Particle Filtration Capacity Test

A 3 ppm suspension of 300 nm polystyrene latex nanospheres was made by diluting a 1 wt % stock solution of nanospheres (Poly Sciences Nanobead NIST Traceable Particle Size Standard PN 64015) in a solution of water and surfactant (Triton X100 Sigma Aldrich in MilliQ de-ionized water). Membrane filter discs and a non-woven support were die cut to a diameter of 25 mm, and loaded into a 25 mm diameter swinnex filter holder (sterlitech PN 540100 PP 25 Polypropylene In-Line Filter Holder).

The filter holder was then attached to a switching 4 way switching valve manifold with an off position and 3 inlet feeds for wet out, rinse, and polystyrene latex suspension. The three inlet feeds were housed in attached pressure vessels (regulated to a set pressure of 5 psi (0.34 bar) with compressed gas). The filtrate from the filter outlet was collected on a balance attached to a PC logging mass data with time.

These data were then processes using a density of (1 g/cm³) to convert mass to volume (V) and a time stamp to calculate the flow rate (change in Volume (V)/time (t)) and permeability (Volume (V)/(time (t)×filter area (a)×pressure (p)). Data were also plotted in the t/V vs. t form to calculate the expected maximum process volume before clogging (Vmax) using a least squares fit to the line in the t/V vs t plot using the standard method (slope=1/Vmax), (F. Badmington, M. Payne, R. Wilkins, E. Honig, Vmax testing for practical microfiltration train scale-up in biopharmaceutical processing, Pharmaceut. Tech., 19 (1995) 64).

The switching valve allows the sample to be wet out with isopropyl alcohol, flushed a solution of water and surfactant (1 wt % Triton X100 in water described above) solution, and then challenged with the 3 ppm polystyrene latex suspension. Hydrophobic membrane samples were wet with 10 ml of alcohol, flushed with 100 ml of surfactant water solution, and then challenged, with 3 ppm latex beads. Hydrophilic samples were challenged with 3 ppm latex solution with no prewet. Area values for the Comparative Examples 4B and 4D were based on the inner diameter of the o-ring, and for inventive examples 4A and 4C were based on measurement of the unfolded area of the sample measured from a digital picture.

The results for the testings of Example 4 are given in Table 3:

TABLE 3

| Example | Vmax (ml) | Vmax Increase factor | Average flow rate (ml/s) | Area (cm²) | Area increase factor |
|---|---|---|---|---|---|
| 4A (structured) | 2000 | 3.4 | 0.8 | 14.4 | 3.8 |
| 4B (flat) | 588 | | 0.3 | 3.8 | |
| 4C (structured) | 1667 | 1.8 | 0.2 | 8.9 | 2.3 |
| 4D (flat) | 909 | | 0.3 | 3.8 | |

The "Area increase factor" was determined by dividing the area of the structured film by the area of the backer. The area of the structured film was measured after removing the structured film from the backer by heating the sample to melt the adhesive and after successive unfolding the removed film.

Example 5

A three layer composite ePTFE membrane was made by processes described in U.S. Pat. No. 7,306,729. The composite membrane had an average matrix tensile strength of 13768 PSI (94.9 MPa), an ATEQ airflow of 74.9 L/h, a bubble point of 34.8 psi (2.40 bar), a porosity of 81%, a thickness of 1.6 mil, mass/area of 16.7 g/m², and a pore size of 0.147 microns. This membrane was rendered hydrophilic and water wettable by coating with polyvinyl alcohol by processes known in the art such those as described in U.S. Pat. No. 5,874,165A.

For Reference Example 5A and Examples 5B and 5C, a standard backer material as described above has been applied as in Reference Example 1.

Examples 5B and 5C have been processed by standard biaxial processing on a device as shown in FIG. 1. For Example 5C, in addition a hot air gun was pointed with a distance of 4 cm to the applied sample. After heating for a time needed to achieve the desired temperature, measured with an IR heater pointed on the material, the sample was pressed against a carrier with a rubber roll and shrunk back as described. The valve was completely opened so that the process was below 1 second to avoid cooling at processing.

Results are given in Table 4:

TABLE 4

| | Example 5A (reference) | Example 5B | Example 5C |
|---|---|---|---|
| processing type | — | biaxial | biaxial |
| processing ratio (%) | 100 | 200 | 200 |
| processing temperature (° C.) | — | 20 | 140 |
| elastic substrate | — | Elastosil RT620 | Elastosil RT620 |
| elastic substrate surface | — | smooth | smooth |
| airflow ATEQ at 70 mbar - up (l/h) | 68.8 | 240.2 | 213.00 |
| airflow ATEQ at 70 mbar - down (l/h) | 74.4 | 180.2 | 213.60 |
| structure height (μm) | — | — | — |
| structure density direction x | — | 1.0/mm | 2.9/mm |
| structure density direction y | — | 1.2/mm | 3.2/mm |

Example 6

A layer of electrospun PVA (polyvinyl alcohol) nanofibers was deposited on to a polypropylene spunbond non-woven by free surface electrospinning via processes and solution conditions described in U.S. Pat. No. 7,585,437 B2 using an elmarco nanospider. The PVA nanofiber layer was removed from the spun bond intact by careful peeling. The layer as removed had a basis weight of 1.7 g/m², a fiber diameter of 250 nm and an ATEQ air flow of 219 l/h.

A standard backer material as described above has been used and applied as in Reference Example 1.

Example 6B has been processed by using standard biaxial processing. In addition, in Example 6B an acrylic glass plate was placed on top of the film at the retraction to guide more uniform winkle formation.

Results are given in Table 5.

TABLE 5

| | Example 6A (reference) | Example 6B |
|---|---|---|
| processing type | — | biaxial |
| processing ratio (%) | 100 | 200 |
| processing temperature (° C.) | 20 | 20 |
| elastic substrate | — | Elastosil RT620 |
| elastic substrate surface | — | smooth |
| airflow ATEQ at 70 mbar - up (l/h) | 142.40 | 393.80 |
| airflow ATEQ at 70 mbar - down (l/h) | 150.20 | 398.90 |
| structure height (μm) | — | 744 |
| structure density direction x | — | 1.2/mm |
| structure density direction y | — | 1.0/mm |

The invention claimed is:

1. A process for the formation of a structured porous film comprising:
   a) applying a porous film onto an elastic substrate in a stretched state such that a reversible adhesion of the porous film on the stretched substrate occurs,
   b) relaxing the substrate with the applied film thereon to obtain a structured porous film, and
   c) removing the structured porous film from the substrate.

2. The process according to claim 1, further comprising applying a backer material to the structured porous film.

3. The process according to claim 1, wherein the porous film comprises a member selected from fluoropolymer, a polyvinylalcohol, a polyurethane and combinations thereof.

4. The process according to claim 3, wherein the porous film comprises a member selected from polytetrafluoroethylene (PTFE) a modified PTFE, a fluorothermoplastic, a fluoroelastomer and combinations thereof.

5. The process according to claim 1, wherein the porous film has a thickness between 0.5 µm and 250 µm.

6. The process according to claim 1, wherein the substrate comprises a member selected from a polysiloxane, fluorosilicone a rubber and combinations thereof.

7. The process according to claim 1, wherein the substrate is stretched at a processing ratio of at least 110% in at least one direction.

8. The process according to claim 1, wherein the elastic substrate is stretched at a processing ratio of at most 1100% in at least one direction.

9. A structured porous film obtained by the process according to claim 1.

10. The structured film according to claim 9, wherein structures in the structured film have a height of at least two times the thickness of a non-structured film, and wherein the structure density in at least one direction is at least 1/mm.

11. A structured porous film comprising a porous film reversibly adhered to an elastic substrate, wherein structures in the porous film have a height at least two times the thickness of a non-structured film and the structure density in at least one direction is at least 1/mm.

12. The structured porous film according to claim 11, wherein the structure density in at least one direction is at least 2/mm.

13. The structured porous film according to claim 12, wherein the structure height is from 2 µm to 2000 µm.

14. The structured porous film according to claim 13, wherein the area increase factor of the structured film is at least 1.8.

15. An article comprising a structured porous film according to claim 11, wherein said elastic substrate is removed.

16. The article according to claim 15, wherein the article is a vent or a filter.

17. A structured porous film obtained by the process of claim 1, wherein said structured porous film has applied thereto a backer material to form a composite, and wherein said composite has an asymmetric airflow of at least 30%.

18. A composite comprising a structured film obtained by the process of claim 1 and having an asymmetric airflow of at least 30%.

19. A structured porous film consisting of:
a porous film having structures in the porous film that have a height at least two times the thickness of a non-structured film and the structure density in at least one direction is at least 1/mm,
wherein said porous film has a multi-layered structure.

20. The structured porous film according to claim 19, wherein the structure density in at least one direction is at least 2/mm.

21. The structured porous film according to claim 20, wherein the structure height is from 2 µm to 2000 µm.

22. A structured porous film comprising:
a porous film having structures therein that have a height at least two times the thickness of the non-structured film and the structure density in at least one direction is at least 1/mm,
wherein said structures are permanent in said porous film separate from a substrate.

23. The structured porous film according to claim 22, wherein the structure density in at least one direction is at least 2/m.

24. The structured porous film according to claim 22, wherein the structure height is from 2 µm to 2000 µm.

25. The structured porous film according to claim 24, wherein the area increase factor of the structured film is at least 1.8.

26. The structured porous film according to claim 22, wherein said porous film has a multi-layered structure.

27. The structured porous film according to claim 11, wherein said porous film has a multi-layered structure.

28. The composite of claim 18, wherein said composite is in the form of a vent or filter.

* * * * *